US008792941B2

(12) United States Patent
Panchal

(10) Patent No.: US 8,792,941 B2
(45) Date of Patent: *Jul. 29, 2014

(54) METHOD AND APPARATUS OF VIRTUALIZED RESOURCE SHARING IN CELLULAR NETWORKS

(75) Inventor: Jignesh S. Panchal, Somerset, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 13 days.

This patent is subject to a terminal disclaimer.

(21) Appl. No.: 13/613,159

(22) Filed: Sep. 13, 2012

(65) Prior Publication Data

US 2014/0073335 A1     Mar. 13, 2014

(51) Int. Cl.
*H04B 3/38*     (2006.01)

(52) U.S. Cl.
USPC ............... 455/561; 455/550.1; 455/452.1; 370/329

(58) Field of Classification Search
USPC ............... 455/452.1, 550.1, 561; 370/329
See application file for complete search history.

(56) References Cited

U.S. PATENT DOCUMENTS

| 7,404,074 | B2* | 7/2008 | Murotake | 713/100 |
|---|---|---|---|---|
| 2005/0032480 | A1* | 2/2005 | Lee et al. | 455/76 |
| 2007/0105589 | A1* | 5/2007 | Lu | 455/556.2 |
| 2008/0112361 | A1* | 5/2008 | Wu | 370/330 |
| 2009/0098904 | A1* | 4/2009 | Fujii et al. | 455/552.1 |
| 2009/0245221 | A1* | 10/2009 | Piipponen | 370/343 |
| 2010/0115528 | A1* | 5/2010 | Piipponen et al. | 718/104 |
| 2010/0304686 | A1* | 12/2010 | Kennedy et al. | 455/67.11 |
| 2011/0075596 | A1* | 3/2011 | Moreira et al. | 370/310 |
| 2011/0176519 | A1* | 7/2011 | Vitthaladevuni et al. | 370/336 |
| 2011/0243264 | A1* | 10/2011 | Hultell et al. | 375/260 |
| 2012/0071184 | A1* | 3/2012 | Lin | 455/507 |
| 2012/0269148 | A1* | 10/2012 | Hultell et al. | 370/329 |
| 2013/0070609 | A1* | 3/2013 | Hultell et al. | 370/241 |
| 2013/0090124 | A1* | 4/2013 | Panchal et al. | 455/452.1 |
| 2013/0201830 | A1* | 8/2013 | Wang et al. | 370/235 |
| 2013/0295946 | A1* | 11/2013 | Panchal et al. | 455/452.1 |

* cited by examiner

*Primary Examiner* — Danh Le
(74) *Attorney, Agent, or Firm* — Harness, Dickey & Pierce

(57) ABSTRACT

According to a disclosed method in a base station having one or more physical sectors, instructions received from a core network cellular network operators that are parties to a sharing agreement and specify an amount of radio resources that are to be temporarily shared under the sharing agreement. In the sharing state, the physical sector instantiates at least two concurrently running protocol stacks dedicated to respective cellular network operators that are parties to the sharing agreement, thus defining virtualized sectors.

15 Claims, 13 Drawing Sheets

RESOURCE SHARING PROCESS

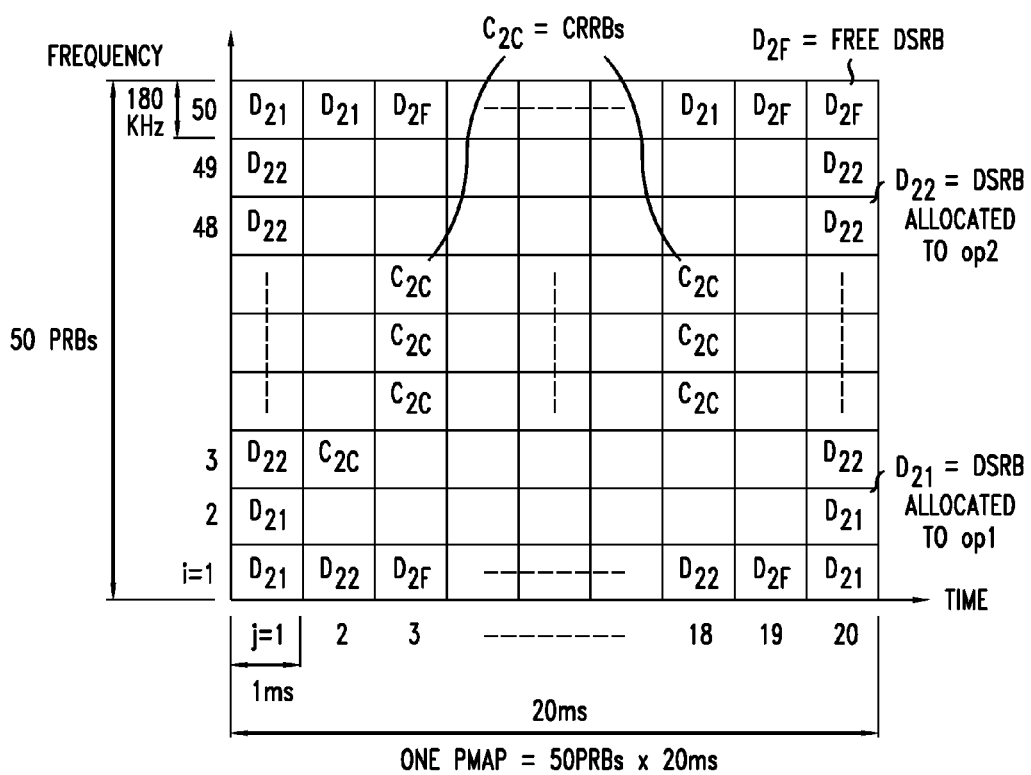

METHOD AND APPARATUS OF VIRTUALIZED RESOURCE SHARING IN CELLULAR NETWORKS

CROSS-REFERENCE TO RELATED APPLICATIONS

The subject matter of this patent application is related to the subject matter of to the commonly assigned U.S. patent application Ser. No. 13/253,120, filed on Oct. 5, 2011 by M. Buddhikot and J. Panchal under the title "Dynamic Resource Sharing among Cellular Networks" and Ser. No. 13/461,979 filed on May 2, 2012 by M. Buddhikot and J. Panchal under the title "Method and Apparatus of Dynamic Spectrum Sharing in Cellular Networks". The abovesaid patent application Ser. No. 13/253,120 and Ser. No. 13/461,979 are hereby incorporated herein in entirety.

FIELD OF THE INVENTION

The invention relates to methods and apparatus for operating radio access networks and core networks of wireless communication systems, and more particularly to methods and apparatus by which different networks can share resources.

ART BACKGROUND

One desired goal of cellular network operators (which we may also refer to as "service providers" or "operators") is to be able to provide uninterrupted services with quality and efficiency to as many mobile customers as possible. To approach this goal requires a favorable balance among customer experience and satisfaction, network performance, and costs.

One way for operators of different networks to improve performance and reduce their capital and operating costs is to share resources. That is, a given network is unlikely to use 100% of its resources 100% of the time. Therefore, there is an opportunity for different networks operating in a given geographical area to pool some of their respective resources to achieve greater overall efficiency. This can, for example, reduce the rate of outages and increase the effective network capacity and RF coverage without deploying more base stations.

However, there are still commercial and technical barriers to the achievement of large-scale resource sharing among cellular operators. Accordingly, there remains a need for methods of resource sharing that are technically and commercially feasible.

SUMMARY OF THE INVENTION

We have developed such a method. Our method of resource sharing implements a sharing process that is initiated when an MME in a network, or other similar network entity, analyzes KPIs from the cells it serves and based on the KPIs, and decides to engage in sharing. The, e.g., MME then contacts a sharing entity (SE) to announce that it wants to supply spectrum. The MME obtains terms of a sharing to agreement from the SE and the MME obtains the identity of the other network. In response to this information, the MME configures its base stations to support the supplying of spectrum to the further operator according to the terms of the sharing agreement. The SE applies knowledge of network topology and of services offered. This knowledge is obtained from a sharing database. The sharing database is compiled from information that the SE obtains from the MMEs. The sharing database may be updated when, e.g., new base stations go online. At the expiration of the sharing agreement, the SE tells the MME to deactivate the sharing agreement. Because a sharing agreement is subject to eventual expiration, it should be understood to be temporary. However, the durations of sharing agreements may vary from small fractions of a second to hours, days, or even longer spans of time.

We note in this regard that at least in LTE networks, the MME is a particularly advantageous choice as the control plane (C-plane) hub between the radio access network (RAN) and the evolved packet core (EPC) for the purposes described here, because under existing standards, it already occupies a privileged position in the network, where it manages the assignment of network resources and all other control-plane functions related to subscriber and session management.

Accordingly, an embodiment of our invention is a method in a base station having one or more physical sectors. Modules in the base station receive instructions from a network node which identify two or more cellular network operators that are parties to a sharing agreement, and which specify an amount of radio resources that are to be temporarily shared under the sharing agreement; activate a sharing state in a selected one or more of the physical sectors in response to the sharing instructions; and deactivate the sharing state when the sharing agreement expires or terminates. A "module" in this regard may be a specialized circuit or combination of circuits, or it may be a set of instructions recorded in a machine-readable memory, together with general-purpose or special-purpose circuitry capable of carrying out the recorded instructions.

The process for activating the sharing state in each said physical sector includes configuring the physical sector to instantiate at least two concurrently running protocol stacks dedicated to respective cellular network operators that are parties to the sharing agreement; configuring at least one software-defined to programmable radiofrequency front end (SDRFfe) of the physical sector for operation on spectrum that is allocated in response to the sharing agreement; and directing mobile terminals subscribing to two or more of the network operators and served by the physical sector to operate on radio resources allocated to their respective operators.

In another embodiment, base station apparatus includes at least one physical sector configurable to instantiate at least two concurrently running protocol stacks; an activation module; at least one software-defined programmable radiofrequency front end (SDRFfe) comprised by the physical sector; and a radio resource module. The activation module is configured to activate a sharing state in at least one said physical sector in response to instructions to implement a sharing agreement received from a network node and to deactivate the sharing state when the sharing agreement expires or terminates. The sharing state is characterized, in part, by concurrently running two or more protocol stacks dedicated to respective cellular network operators that are parties to the sharing agreement. The radio resource module is configured to respond to the received instructions by configuring at least one said SDRFfe to operate on spectrum that is allocated in response to the sharing agreement. The base station apparatus further includes a module operative to direct mobile terminals subscribing to two or more of said network operators to operate on radio resources allocated to their respective operators.

BRIEF DESCRIPTION OF THE DRAWINGS

FIG. 13 provides an example of a map of fifty downlink PRBs, referred to here as a PDMAP, which in this example is associated with a 10-MHz downlink shared spectrum band.

DETAILED DESCRIPTION

For purposes of illustration, we will describe embodiments of our invention with specific reference to LTE networks. However, such choice of network technology should be understood as merely illustrative, and not as limiting. In fact, our ideas are usefully employed in various other network technologies, such as WiMAX.

Figure 1:
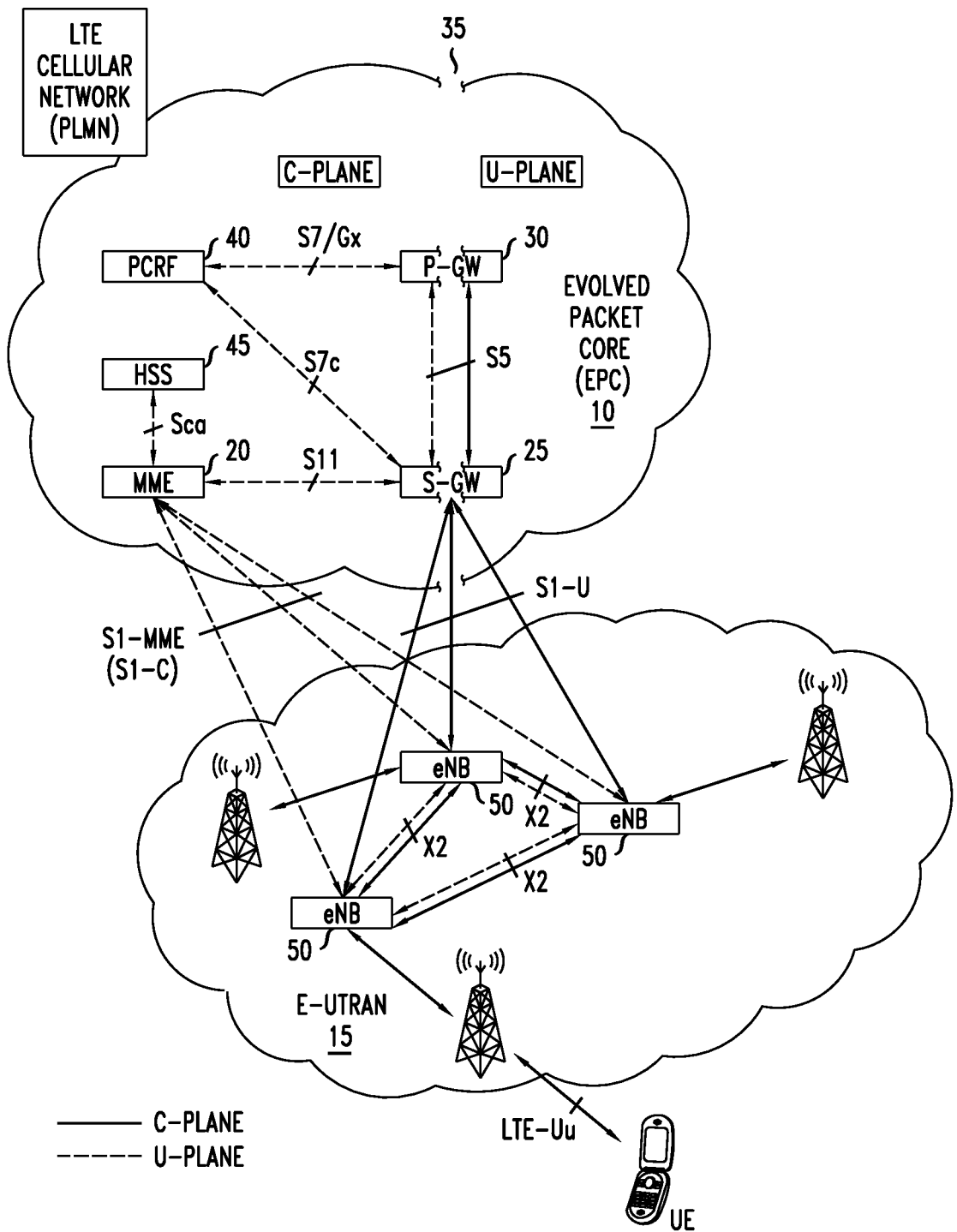
FIG. 1 is a schematic diagram illustrating the architecture of an LTE network of the prior art.

A brief description of LTE networks will now be provided with reference to FIG. 1.

LTE ("Long Term Evolution") is a Fourth Generation mobile cellular network technology that is evolved from UMTS, and that includes an all-IP networking architecture. LTE is being introduced through a series of releases by the 3rd Generation Partnership Project (3GPP). In LTE, the architecture of the GPRS core network is replaced by the System Architecture Evolution (SAE), which is a flat, IP-based network architecture. Because LTE is all-IP from end to end, the mobile handsets and other terminal devices for LTE have embedded IP capabilities, and the base stations, referred to as Evolved NodeBs (eNodeBs) are IP-based.

As seen in FIG. 1, the LTE system architecture includes core network 10, referred to as an Evolved Packet Core (EPC), and radio access network 15, referred to in LTE as an Evolved UTRAN (E-UTRAN). The entities in the E-UTRAN and EPC are interconnected via standardized IP-based interfaces.

With further reference to the figure, the EPC will be seen to include MME (Mobility Management Entity) 20, Serving Gateway (S-GW) 25, and Packet Gateway (P-GW) 30. The MME performs the signaling and control functions to manage the access by the mobile user terminals (referred to in LTE as UEs, for "user equipment") to network service. The MME also manages the assignment of network resources, and it manages the mobility states to support tracking, paging, roaming, and handovers. The MME also manages all other control-plane functions related to subscriber and session management.

The S-GW is a data plane element. Its primary function is to manage user-plane mobility and to act as a demarcation point between the radio access network (RAN) and the core networks. The SGW maintains data paths between eNodeBs and the P-GW.

The P-GW is the termination point of the packet data interface toward the packet data networks. As such, it is the entry and exit point for traffic for the UEs. The P-GW supports operator-defined policy for resource allocation and usage, packet filtering, and charging.

One feature of the EPC is a clear separation between the Control plane (C-plane) and User-plane (U-plane) interfaces. This is advantageous because it allows independent scaling of the two planes in order to manage their latency performances. The C-plane includes interfaces to carry the user mobility, authentication and policies, entity configuration and OAM (Operation Administration and Management) related messages, whereas the U-plane interfaces carry user traffic. Expansion of the C-plane depends on the number of mobile terminals and their mobility patterns. Expansion of the U-plane depends on the aggregated data throughput requirements. As will be seen, the separation between these planes can facilitate capacity sharing among different LTE cellular networks.

The separation between the C-plane and the U-plane is delineated in FIG. 1 by conceptual boundary 35. It will be seen that on the control side of the boundary, there are two further network entities: PCRF 40 and HSS 45.

The PCRF supports service data flow detection, policy enforcement, and flow-based charging. (In LTE, a service data flow—SDF—is the virtual connection that carries data-plane traffic.) The HSS ("Home Subscriber Server") is a user database that supports the network entities that handle calls. The HSS contains subscription-related information such as subscriber profiles. It authenticates and authorizes users, and supports mobility management, call establishment, and IP session establishment. In its various functions, the HSS combines the earlier HLR ("Home Location Register") and AuC ("Authentication Center").

One significant feature of the E-UTRAN is a relatively flat architecture in which the radio network controller (RNC) and the Base Station Transreceiver (BTS) functionalities are integrated into a single entity, namely the eNodeB (eNB). The eNBs in FIG. 1 are designated by the reference numeral 50. As seen in the figure, the eNB manages three interfaces: It communicates with the EPC on the S1 (S1-C and S1-U combined) interface, it communicates with other eNBs on the X2 interface, and it communicates wirelessly with the UEs on the over-the-air (OTA), LTE-Uu interface.

Via the X2 interface, the eNB is fully connected to all other eNBs in the E-UTRAN. The X2 interface is designed to support user data (U-plane) forwarding from one eNB to another in handover operations and also to manage co-channel interference among eNBs using C-plane communication messages. Thus, the fully connected eNB is evolved into a cellular network edge router. As such, it uses the three interfaces to route data to its destinations, which include the other eNB, the EPC, to and the UEs. As will be seen, the flat E-UTRAN and the eNB edge router can facilitate the dynamic sharing of the E-UTRAN and eNB with other LTE cellular networks.

Figure 2:
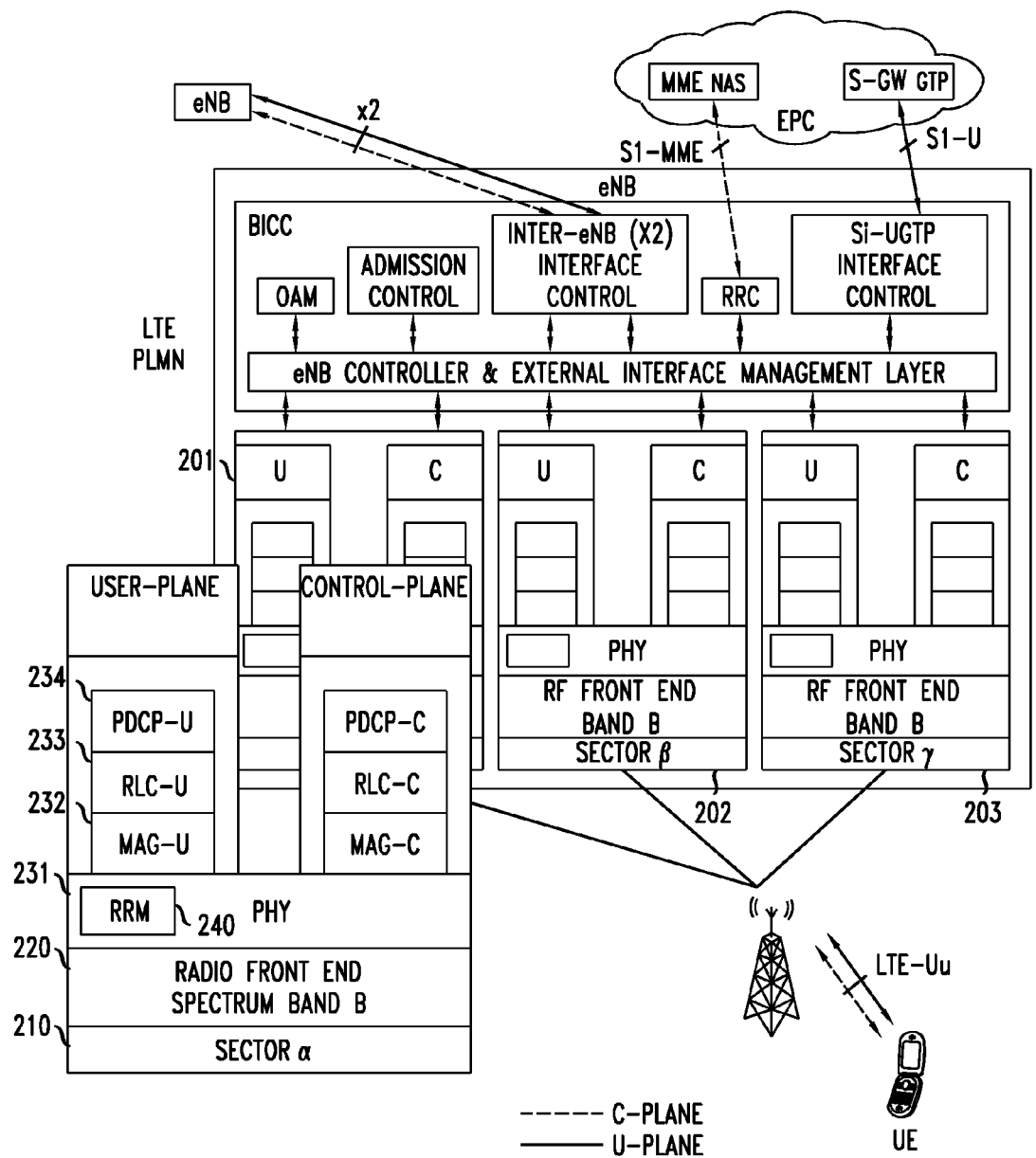
FIG. 2 is a conceptual block diagram of a typical eNodeB of an LTE network of the prior art.

FIG. 2 is a conceptual block diagram of a typical eNB of an LTE network, which is owned and operated by one single operator of an LTE Public Land Mobile Network (PLMN). As seen in the figure, the eNB has three antenna sectors 201, 202, and 203, which are respectively designated as sector α, sector β, and sector γ. The figure includes an expanded view 210 of sector α. For clarity, we note that in the nomenclature of the 3GPP standards, a sector of the eNB is referred as a cell. Herein, we will use the terms cell and sector interchangeably to refer to a sector of an eNB.

Each sector has an RF front end 220 that can be configured to operate on a carrier or a channel, designated in the figure as Spectrum Band B, that may be defined, e.g., by its center frequency and bandwidth. Separately implemented within each sector are the Physical Layer (PHY) 231, Medium Access Control Layer (MAC) 232, Radio Link Control Layer (RLC) 233, and Packet Data Control Protocol Layer (PDCP) 234. The PHY, MAC, RLC and PDCP layers together constitute LTE Layer 1.

The physical layer of the LTE air interface (LTE-Uu) uses Orthogonal Frequency Division Multiple Access (OFDMA) scheme on the downlink (DL), and it uses the Single Carrier Frequency Division Multiple Access (SC-FDMA) scheme on the uplink (UL). These FDMA schemes enable LTE to flexibly support the use of multiple carrier bandwidths, which typically include 1.4, 3, 5, 10, 15 and 20 MHz. LTE supports frequency division duplex (FDD) and time division duplex (TDD), and it also supports discontinuous spectrum aggregation.

The physical layer frame format is 10 ms long and contains ten sub-frames of 1 ms each. Each sub-frame can carry fourteen OFDM symbols. In frequency, each OFDM symbol spans twelve subcarriers, each having a bandwidth of 15 kHz.

In LTE, the minimum unit of scheduling on both the uplink and the downlink is a frequency-time block referred to as a Physical Resource Block (PRB) or Resource Block (RB). In our exemplary implementation, the minimum unit of scheduling is a PRB that consists of fourteen OFDM symbols spanning the twelve subcarriers referred to above, thus spanning 1 ms of time and a total of 180 kHz of bandwidth. Accordingly, the 1.4, 3, 5, 10, 15 and 20 MHz bandwidth options on the uplink and to downlink channels correspond to 6, 15, 25, 50, 75 and 100 PRBs, respectively. Those skilled in the art will recognize that our PRB is an aggregation of two RBs as defined in the LTE standard. However, it should be noted that generalizations to PRBs that aggregate other numbers of RBs are readily achieved and not excluded from the scope of the present invention.

Within the physical layer, a functionality 240 referred as the Radio Resource Management (RRM) performs the mapping between the logical channels and physical channels. The RRM also schedules the various UEs and their services in the uplink and downlink according to their respective priorities, and it makes the selections of Modulation and Coding Scheme (MCS). In implementations of the invention as described below, the RRM also measures the level of resource (i.e., PRB) utilization. This is an example of a key performance indicator (KPI) on the basis of which a decision whether or not to share may be made.

As is well-known, control information of various kinds is broadcast by the eNodeB. The control information broadcast by each sector includes a Master Information Block (MIB) and as many as thirteen different System Information Blocks (SIBs). The MIB and the SIBs are Radio Resource Control (RRC) messages. The MIB is sent on the Primary Broadcast channel (PBCH). The SIBs are sent in the secondary logical broadcast channel carried by the Physical Downlink Shared Channel (PDSCH).

The System Information Block Type 1 (SIB1) contains a parameter referred to as PLMN-id, which identifies the particular network. It should be noted in this regard that the same network operator may operate in different regions under different values of the PLMN-id. However, in the context of the resource sharing that is to be described below, when two networks have different PLMN-ids, they should be understood as networks under different operators, sharing at least part of a common geographical area.

The System Information Block Type 3 (SIB3), System Information Block Type 4 (SIB4) and System Information Block Type 5 (SIB5) contain cell re-selection information and neighbor lists for use in handover operations.

We will now discuss some basic features of cellular network resource sharing as we envisage it.

Parties of various types may participate in resource sharing. One type of party is the established network operator, such as those that currently provide brand name service to large customer populations. Another is a third party that owns and controls cellular resources but is not a network operator. Such a party may be viewed as a resource broker that, e.g., controls spectrum or builds E-UTRANs and leases them to LTE operators. One example might be a direct TV (DTV) operator leasing whitespace to cellular operators. The third type of party is neither an operator nor an owner of resources, but instead may borrow resources in order to become an operator. For example, any of the well-known content providers might at some point wish to operate its own cellular network. To do so, it would borrow resources, i.e., spectrum and hardware, from third parties.

In the sharing scenarios that we will describe below, we introduce a new network entity that we refer to as the Sharing Entity (SE). The SE is an independent entity owned and operated by either a third party or an alliance of cellular network operators who want to take part in resource sharing activities. It coordinates supplies and demands between prospective sharing partners. The sharing partners are different networks, acting through their respective MMEs, that have excess resources to offer for sharing (supplies), or that are requesting, on a temporary basis, a grant of resources from other networks (demands). The MMEs (acting as sharing partners) and the SE (acting as coordinator) take part in a negotiation process, the outcome of which may be a finalized sharing agreement between PLMNs. As will be explained below, the SE also manages the sharing agreements.

Physically, the SE may be deployed as a server hosted by a suitable computing device that is situated at any network node from which it can communicate with the MMEs of the sharing partner networks. Often, it will be advantageous to deploy the SE within a core network. The SE may be hosted, for example, on equipment belonging to a third party or to an alliance of network operators. The SE may alternatively be hosted, on the same machine that hosts a network's MME, although such an option may be less desirable when it is important for the SE to be an independent entity.

Figure 3:
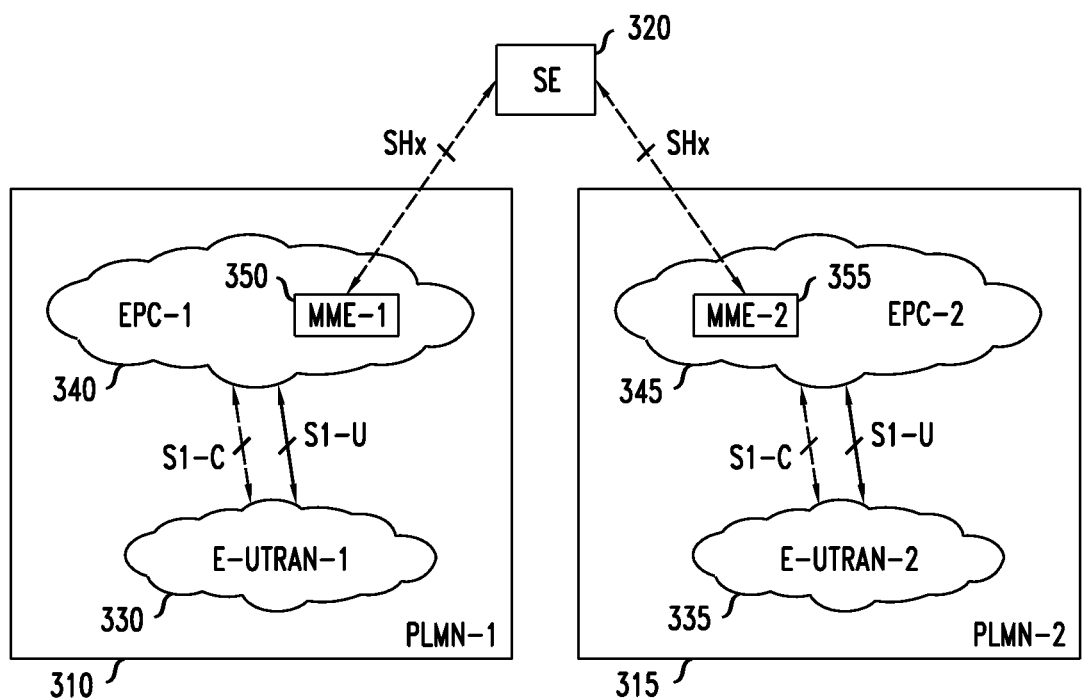
FIG. 3 is a schematic representation, at a high level, of an exemplary architecture in which two LTE networks are operated by two different operators and are candidates for resource sharing with the support of a sharing entity.

FIG. 3 schematically depicts, at a high level, an exemplary architecture in which two LTE networks 310 and 315, denominated PLMN-1 and PLMN-2 in the figure, are operated by two different operators and are candidates for resource sharing with the support of SE 320. As seen in the figure, each network has a respective radio access network 330, 335 and a respective core network 340, 345. Within the core networks are respective MMEs 350, 355. As seen in the figure, each MME communicates with the SE over an IP-based control-plane interface that we have named the SHx interface.

As noted above, the MME serves, on behalf of its network, as the control and decision-making entity for the sharing operations. The MME initiates resource sharing as the representative of its PLMN operator. In particular, it signals to the SE, over the SHx interface, its willingness to engage in a sharing agreement with the other PLMN. The sharing architecture as illustrated is readily extensible to a sharing architecture in which three or more MMEs from different networks connect to the SE and take part in multilateral resource sharing.

In typical scenarios, one SE will be deployed per market, where it will manage all of the neighborhoods that collectively compose the market. "Market" in this regard means the coverage area of an EPC. Thus, for example, a large suburban county might correspond to a market, and its various townships might then be its constituent neighborhoods. Each neighborhood will typically be served by multiple eNBs, and we assume that it will also be served by multiple carriers. Typically, each LTE network operator will assign one MME to a given market to control the eNBs deployed in that market. Since more than one operator may be active in a given market, the market may include multiple MMEs and multiple E-UTRANs, each belonging to a respective operator.

Cellular network resources that may potentially be shared include hardware, spectrum, and capacity. The approach to be described here is directed to hardware sharing. We have described a new approach to network capacity sharing in our U.S. patent application Ser. No. 13/253,120, cited above and discussed below. We have described a new approach to network spectrum sharing in our U.S. patent application Ser. No. 13/461,979, cited above.

Figure 4:
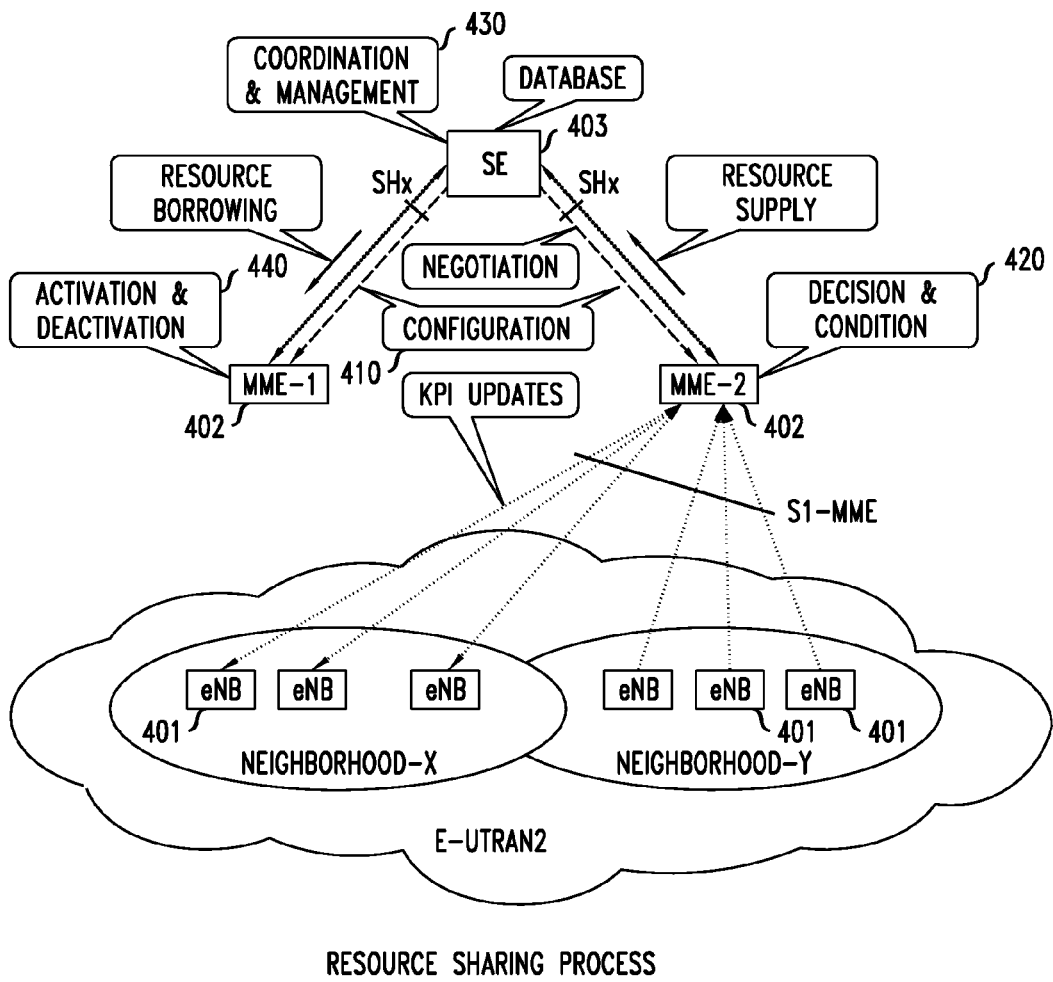
FIG. 4 is a conceptual representation of a sharing process.

FIG. 4 is a conceptual depiction of a sharing process involving eNBs 401, MMEs 402, and the SE 403. The purpose of the process is to create, modify, and dissolve sharing agreements dynamically. In support of that purpose, subsidiary processes activate and deactivate network interfaces and update configurations of network entities such as eNBs.

The sharing process includes four tasks: Configuration 410; Decision and to Condition 420; Coordination, Negotiation, and Management 430; and Activation, Deactivation, and Reactivation 440. Each task is discussed, in turn, below.

Configuration.

This task establishes SHx interfaces between the MMEs belonging to various LTE networks and the SE. The SE uses the SHx interface to collect information from the MMEs to build a sharing database. The sharing database contains topological information related to E-UTRANs (including, specifically, the eNBs) and MMEs in the market. The topological information includes among other things the locations and neighborhoods of the network entities, and the types of wireless services available in the market. The Configuration task runs periodically to update the database when there is any change in topology or any other change in items related to the sharing database.

Decision & Condition.

This task has multiple components distributed among the eNBs, the MMEs, and the SE. One of the components involves measuring or estimating Key Performance Indicators (KPIs). The KPIs are used as input for making sharing decisions. Some of the KPIs that may be useful for that purpose are spectral efficiency, traffic loading, number of active users, spectral utilization or capacity (in terms of radiofrequency bandwidth, for example), co-channel interference, wireline backhaul bandwidth utilization, call-drop statistics, call-blocking probabilities, processor occupancies of various network elements, core network outage rates, and packet drop rates at various network entities. Network elements such as the eNBs measure or estimate the pertinent KPIs and observe their long-term and short-term statistics to assess the performance of the cellular network.

KPIs such as those listed above are conventionally used by operators to drive RF coverage and RAN expansion, spectrum capacity improvement, core network expansion, and other initiatives. However, those skilled in the art will readily appreciate that such KPIs can also be used to make dynamic resource-sharing decisions. Thus, according to one example which is meant to be illustrative but not limiting, one particular KPI, namely the RF bandwidth utilization, may be chosen as the pertinent KPI for making the sharing decisions. Of course in other implementations, other KPIs or combinations of KPIs may be chosen for the same purpose.

In our example, the cells measure their respective spectral utilizations, which they periodically send to the MME over the S1 interface. The MME collects and to analyzes the KPIs for all neighborhoods, and it makes short-term and long-term sharing decisions. Once the MME decides to participate in resource sharing, it sends a message to the SE over the SHx interface. The message may be a borrowing request in which the MME (acting for its PLMN) demands additional resources, or it may be an offer of surplus resources that are available for sharing.

Because patterns of resource consumption in cellular networks change dynamically, a surplus resource such as spectrum, hardware, or overall network capacity should be understood statistically as a multi-dimensional random process which changes over time and space. Accordingly, the parameters specified in a sharing agreement will desirably include the nature of the shared resources (e.g. network capacity, which is the subject of the present discussion, but also possibly spectrum or hardware), the time period for sharing, and the geographical area for sharing. The time duration might be, for example, on the order of minutes, hours or days. It could also be made dynamically variable by the sharing partners, and renewable upon expiration. The geographical limitation might be, for example, to specified neighborhoods or markets. The sharing partners might optionally be able to dynamically activate or deactivate sharing in designated neighborhoods.

In at least some cases, it may be advantageous to specify the amount of resource that is to be shared in terms of a number of users. Whatever the measure of shared resources, the sharing network will generally hold back a reserve capacity so that sudden increases in demand can be accommodated.

The service dimension of the sharing agreement might also be changed dynamically. For example, the sharing partners might, by agreement, reserve the power to dynamically exercise admission control by blocking specified services from inclusion in the sharing agreement.

Various types of events might trigger the MME to issue a sharing message. In one example, the MME is configured with a statistical model of resource usage that takes into account the calendar date, time of day, day of week, and the like. Using historical data and observations of spectral utilization over a recent time window, the model predicts a pattern of resource usage over a period of time. One possible form, among many others, for such a prediction is: "With 90% certainty, spectrum in geographical region r will be utilized at no more than 50%, on average, with a to variance of no more than 5%, for the next h hours." The response might be, e.g., for the MME to offer spectrum to geographical region r for h hours, in an amount that is 50% of available spectrum, less a reserve.

Coordination, Negotiation & Management.

This task is mainly carried out by the SE. It involves processing each sharing demand or sharing supply message that comes in from an MME, and coordinating the messages that arrive from different MMEs. It also involves negotiating the sharing agreements between PLMNs (acting through their respective MMEs) and managing the sharing agreements.

Using the sharing database, which may contain among other information a description of network topology and a list of services available in the various neighborhoods, the SE identifies sharing partners and makes them aware of each others' sharing proposals. The identification of potential sharing partners and the matching of offers with demands is based on the sharing conditions (such as the space and time conditions discussed above) specified by the respective MMEs. The SE matches supplying partners to demanding partners to create supply-demand partnerships. Such partnerships may be one-to-many, many-to-one or one-to-one.

The management of sharing agreements by the SE includes dissolving the agreements when the specified sharing periods expire, supporting the modification and termination of active agreements, and also extending agreements through renegotiation.

The negotiation of the sharing agreement may be carried out by any of various well-known protocols, in which the SE acts as the broker. In one simple example, the SE identifies a pair of potential sharing partners that are willing and able to conform to the sharing conditions. An offer passes from one party (the offeror) to the other (the offeree). The offeree may respond with an acceptance, a counteroffer, or a refusal. In the event of a counteroffer, the original offeror may likewise respond with an acceptance, a counteroffer, or a refusal. The exchange terminates when there is an acceptance, a final refusal, or a timeout. The SE then proceeds to another pair of potential sharing partners.

Activation, Deactivation & Reactivation.

This task is carried out by the MMEs. Once the sharing agreement is reached, the sharing partners (MMEs) configure and direct their network elements to activate necessary and special functionalities and interfaces to support the agreement. Specific actions taken by the to network elements are discussed in detail below.

As discussed above, the SE is responsible for a proper closure of the sharing agreement. The agreement is dissolved after the agreed time period unless the period has been extended. (For example, some implementations might automatically repeat the offer-and-acceptance protocol between the current parties, with updated parameters, upon issuance of an expiration notice.) Upon expiration of the sharing time period, the SE informs the MMEs over the SHx interface that the sharing is being terminated. In response to the termination notice from the SE, the MMEs reconfigure and direct their network elements to deactivate sharing functionalities and interfaces.

The MMEs collect and analyze KPIs during the sharing period. Based on changes in KPIs, the MMEs may be able to prematurely terminate the sharing agreement, extend the sharing agreement beyond the initially agreed time period, or renegotiate the sharing agreement. Similarly, the MMEs may also respond to requests issued by the SE for modifications or extensions of the sharing agreement. The SE might issue such requests, for example, in response to information received from other potential sharing partners.

Capacity Sharing—General Discussion

Before describing our new approach for hardware sharing, we will briefly review some of the ideas concerning network capacity sharing that are described in our U.S. patent application Ser. No. 13/253,120, which was cited above. By capacity, we mean the cumulative serving capability of an entire cellular network or of a sub-network (such an e-UTRAN) within the cellular network, as quantifiable by the number of subscribed and roaming customers.

In a broad sense, network capacity sharing may be viewed as an inter-operator load balancing scheme. In that scheme, an operator with a lightly loaded network helps to balance the overall traffic load within a market by accepting additional traffic from a heavily loaded operator on a dynamic basis, and by carrying the accepted load.

Conventional roaming among cellular networks may be thought of as a form of network capacity sharing. However, roaming access as currently practiced is mainly limited to areas that have intermittent coverage or that lack home coverage, so that in order to obtain wireless service, customers must perforce roam into other operators' networks. As will be explained below, we expanded the roaming concept to by applying an open-network strategy that does not limit roaming to certain areas, but instead may in principle permit roaming at all points in the network.

To support an expanded concept of roaming, it is advantageous to have a new, broader type of inter-operator roaming agreement, enhanced protocols and procedures, and enhanced architectural and infrastructural features of the wireless network.

One procedure that is advantageously modified is the procedure as defined, e.g., in 3GPP, by which a UE makes a selection of the serving network and the serving cell. The standard procedure is described at 3GPP TS 25.304, "Evolved Universal Terrestrial Radio Access (E-UTRA) and Evolved Universal Terrestrial Radio Access Network (E-UTRAN)—User Equipment (UE) procedures in idle mode and procedures for cell reselection in connected mode," http://www.3gpp.org/ftp/Specs/html-info/25304.htm.

According to the conventional procedure, the UE (unless it is a cognitive UE exercising an open network strategy) must give priority to its home PLMN. But under an open network strategy according to some of our new ideas, a UE subject to a sharing agreement that is currently in force may instead apply the same priority all PLMNs involved in the sharing agreement. Accordingly, the UE is free to request access to, or to hand over to, a cell of any of the sharing partner networks.

In an exemplary open network strategy, each UE is provisioned with two or more PLMNs, including at least a Home PLMN and a Roaming PLMN. The provisioned PLMNs are given equal priority for access. Each UE is granted the freedom to select a cell affiliated to any of the equal-priority PLMNs for access based solely on channel quality, without discrimination among the various PLMNs. For such cell selection, channel quality may be signified by, e.g., RSRP or RSRQ.

Under such an arrangement (and given two or more PLMNs acting as sharing partners), the UE measures the radio channels from cells of all pertinent PLMNs. The UE then selects a serving cell with the best radio channel from any of the PLMNs for access or handover. One basis for choosing the "best" channel is provided by the RSRP; that is, the best channel is the one for which the RSRP is highest.

In alternatives to the open network strategy, the LTE radio access network (i.e., the UTRAN) may steer the UEs. In steering, the network signaling is used to transfer the UE from one network operator to another, e.g. temporarily or for the duration of the connection. Various strategies may be employed to support steering, including forcing handover of active UEs from one operator to another, broadcasting multiple operator identifiers, and updating neighbor lists to include base stations that serve UEs subscribing to multiple operators. In a further strategy, referred to as "measurement configuration", a UE periodically measures the received signal strength on certain channels from various base stations that can support it, and that may belong to different operators.

Configuration information may be broadcast on a control channel to identify the sharing partners to the UEs. This can be done whether or not an open network strategy is being employed. In LTE, for example, the necessary configuration information can be broadcast on the SIBs. In one possible implementation, for example, SIB 1 is updated to contain the PLMN identities of all sharing partner networks. As a consequence, each affected UE perceives the cells (i.e., the eNBs) of each of the sharing partners as part of its own home network, and therefore as free to be selected for access or handover. In such an implementation, SIB3 and SIB5 may also be broadcasted with updates of the identities of the sharing partners for use in the selection and reselection of serving cells, and they may be updated with neighbor lists that are modified so as to support handover among the partner networks.

It should be noted in this regard that current 3GPP standards support so-called "measurement configuration", in which each of one or more specific UEs provides its own cellsite and neighbor cellsites with periodic or event-based RSRP measurement updates. By means of measurement configuration and other methods discussed above, the eNB that is currently serving a UE can acquire enough information to steer the specific UE to a different PLMN if the UE is eligible and circumstances warrant the transfer. Thus in a handover, for example, the UE will select a target eNB and will notify the target eNB that it has been selected. If the target eNB belongs to a PLMN that is a sharing partner, the PLMN of the target eNB will send confirmation to the source eNB.

Spectrum Sharing—General Discussion

We now turn to a description of an architecture and techniques for spectrum sharing as previously described in U.S. patent application Ser. No. 13/461,979, cited above. In the discussion below, we will describe implementations of our spectrum sharing architecture in the context of LTE networks. The ideas to be described here are applicable to LTE networks operating in the FDD mode as well as to those operating in the TDD mode. Moreover, our choice of LTE networks should be understood as illustrative and not limiting.

Initially, it should be noted that the types of spectrum resources that may be shared include licensed wireless service spectrum, spectrum that is unlicensed and commonly available, and spectrum that is licensed for non-cellular wireless services, which we refer to below as whitespace.

It will be understood that in the illustrative scenarios to be described below, the only networks that are active in borrowing spectrum are the LTE cellular networks. On the other hand, the source networks that supply the borrowed or shared spectrum may without limitation include other LTE networks, non-cellular wireless service networks such as DTV networks, and government-owned entities that act as spectrum brokers. Thus, for example, LTE networks may be suppliers of licensed cellular spectrum, whereas non-cellular service networks may supply licensed non-cellular spectrum, and government brokers may supply unlicensed cellular spectrum.

Figure 5:
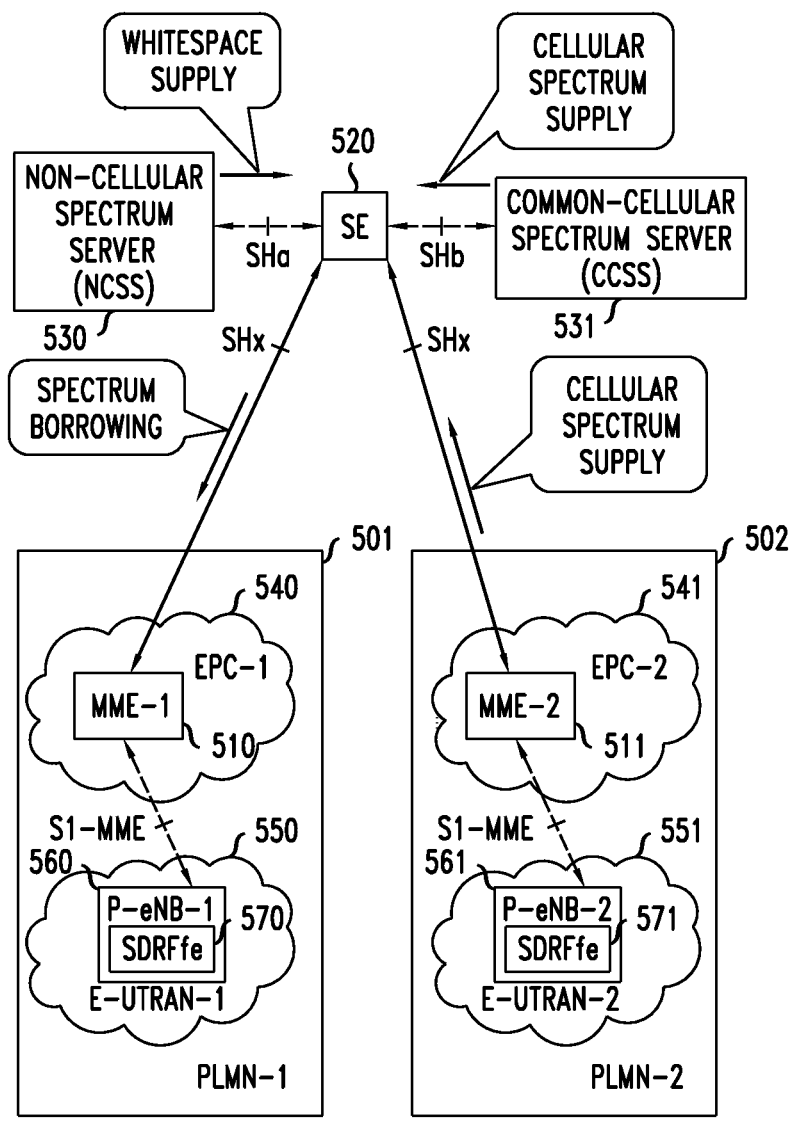
FIG. 5 is a schematic representation, at a high level, of an exemplary architecture in which two LTE networks are operated by two different operators and are candidates for spectrum sharing with the support of a sharing entity and base stations having software-defined programmable front ends in accordance with a method that we have previously described.

Turning now to FIG. 5, it will be seen that two LTE networks 501, 502 are shown, which are respectively designated PLMN-1 and PLMN-2 and respectively managed by operators op1 and op2. The spectrum sharing is initiated by an MME such as MME-1 or MME-2, respectively identified by reference numerals 510 and 511 in the figure, and it is coordinated by sharing entity (SE) 520.

Among other functions, the SE manages the secondary marketplace for the licensed cellular spectrum supplied by the MMEs of cellular supplier networks, as well as for whitespace and unlicensed spectrum. Sources of whitespace and unlicensed spectrum are respectively made available for transacting with the SE by servers 530 and 531, which are respectively designated Non-Cellular Spectrum Server (NCSS), and Common Cellular Spectrum Server (CCSS).

NCSS 530 supplies information on available whitespace to the SE over the SHa interface as shown in the figure. In some implementations, the NCSS may be part of an independent sensor network deployed for the detection of available whitespace.

In some implementations, the SE bears the further responsibility of controlling to interference by disallowing the sharing of overlapping spectrum among multiple parties if the use of borrowed carriers by such parties is predicted to increase interference in the affected geographical region. For such purpose, one useful descriptor of the interference level is Interference Over Thermal (IOT). Use of IOT for interference control is discussed in greater detail below.

CCSS 531 supplies information on available unlicensed and commonly available spectrum to the SE over the SHb interface as shown in the figure. Common spectrum will typically be reserved and identified by a government regulatory authority, thus obviating any need to actively search for it. Indeed, the CCSS will typically be owned by the government authority.

As seen in the figure, each of the MMEs is embedded in one of two evolved packet cores 540, 541, which are respectively designated EPC-1 and EPC-2. Each of the evolved packet cores is shown in communication with a respective one of two access networks 550, 551, respectively denominated E-UTRAN-1 and E-UTRAN-2. The figure includes one representative base station 560, 561 in each access network, the base stations being respectively designated P-eNB-1 and P-eNB-2. The base stations are labeled in the figure as "P-eNodeB"s. The designation "eNodeB" is in accordance with LTE terminology. The prefix "P" indicates that the illustrated base stations are adapted to be programmable in a sense that will be further elaborated below.

With further reference to FIG. 5, it will be seen that each base station includes a software-defined programmable radiofrequency front end (SDRFfe) 570, 571. More generally, an SDRFfe will be provided for each sector or cell that is served by a P-eNodeB. Software defined radio (SDR) is a well-known technology that uses digital sampling and digital processing techniques to perform, in the digital domain, various functions that belong to the analog domain in conventional radio transmitters and receivers. Among other benefits, the use of digital techniques enhances the operator's ability to flexibly define frequency channels and to shift signals among channels. Accordingly, the SDRFfe is a radiofrequency front end that uses software defined radio to dynamically tune the operating frequency and dynamically define the operating bandwidth. Among other things, the frequency and bandwidth of the shared spectrum can thereby be specified and dynamically updated.

For example, a programmable radiofrequency (RF) front end supporting cellular spectrum might be programmed to support a plurality of channel bandwidths including the well-known standard LTE bandwidths of 1.4, 3, 5, 10, 15 and 20 MHz. It could also support discontinuous spectrum carrier aggregation so that each sector or cell of the P-eNB is capable of acquiring multiple, noncontiguous cellular spectrum bands and operating on them concurrently.

It should be noted that the current 3GPP standard does not support LTE operation on unlicensed spectrum and whitespace. As a consequence, borrowing of unlicensed spectrum and whitespace by an LTE-compliant network is precluded at present. However, sharing of cellular spectrum between a pair of LTE networks or operators could be possible under the present standard. We will now turn to a discussion of how inter-operator cellular spectrum may achieve practical realization.

Now we will also briefly review some of the ideas concerning network spectrum sharing that were described in our above-cited U.S. patent application Ser. No. 13/461,979.

Spectrum Division and Sharing—Examples

We begin by considering the behavior of the supplier network during the Activation, Deactivation, Reactivation phase of the sharing process, which we have described above. It will be understood that communication between the MME and the eNodeBs with which it is associated takes place during this and other phases over the S1 interface, as noted above and as illustrated in FIGS. 1, 2, 4, and 5.

In order for the network to make a full or partial release of the shared spectrum, i.e., of the spectrum designated for inter-operator sharing, the MME of the supplier network will first check whether other operational carriers are available. If other carriers are found, the supplier MME will identify active UEs that are camped on the shared spectrum, and will redirect them to the other carriers. Procedures useful for this purpose are described, e.g., in the standards document 3GPP TS 36.331, "Evolved Universal Terrestrial Radio Access (EUTRA) and Evolved Universal Terrestrial Radio Access Network (EUTRAN)—Radio Resource Control (RRC) protocol specification," http://www.3gpp.org/ftp/Specs/html-info/36331.htm.

If no carriers are available, the supplier MME will initiate a process that we refer to as Spectrum Division and Sharing. The purpose of this process is to divide fully allocated but underutilized spectrum in such a way that a portion of it ("partial" spectrum) can be retained to serve the active UEs on the supplier network, while emptying the rest of the spectrum so that it can be released for sharing. Software defined radio is helpful in implementing this process because of the flexible manner in which it can define multiple frequency bands having various bandwidths.

After the spectrum has been divided, the retained spectrum is reconfigured. For example, let us suppose that during a given time period, the utilization of a 20 MHz wide band of LTE spectrum is found to be one-fourth the capacity of the band. In view of this, the operator decides to retain only 5 MHz of the spectrum, and to release the remaining 15 MHz to other operators in a neighborhood. As a consequence, the eNBs operating on the 20 MHz spectrum in the neighborhood will now need to be reconfigured to operate on the retained 5 MHz of bandwidth.

So that such a reconfiguration of spectrum can be performed without disrupting service, the supply sectors, i.e., the affected sectors of the spectrum-supplying network, will temporarily bar acceptance of new calls by, e.g., setting the barred flag in the SIB1 broadcast message as described in the standards document 3GPP TS 36.331, "Evolved Universal Terrestrial Radio Access (EUTRA) and Evolved Universal Terrestrial Radio Access Network (EUTRAN)—Radio Resource Control (RRC) protocol specification," cited above. Similarly, acceptance of handovers will also be temporarily barred.

All active UEs in the sharing supply sector that are registered to the spectrum-supplying operator are interrupted temporarily, and they are directed to resynchronize to their current serving cell on the retained 5 MHz spectrum, after division of the retained spectrum from the original 20 MHz spectrum. Concomitant with the reduction in channel bandwidth from 20 MHz to 5 MHz, the time-frequency locations of the physical channels will also change; that change must be communicated to the active UEs.

LTE networks as currently implemented do not support dynamic spectrum reconfiguration without service disruption as described here. We will therefore provide one example of an enhancement to LTE operations that can provide the needed support.

Figure 6:
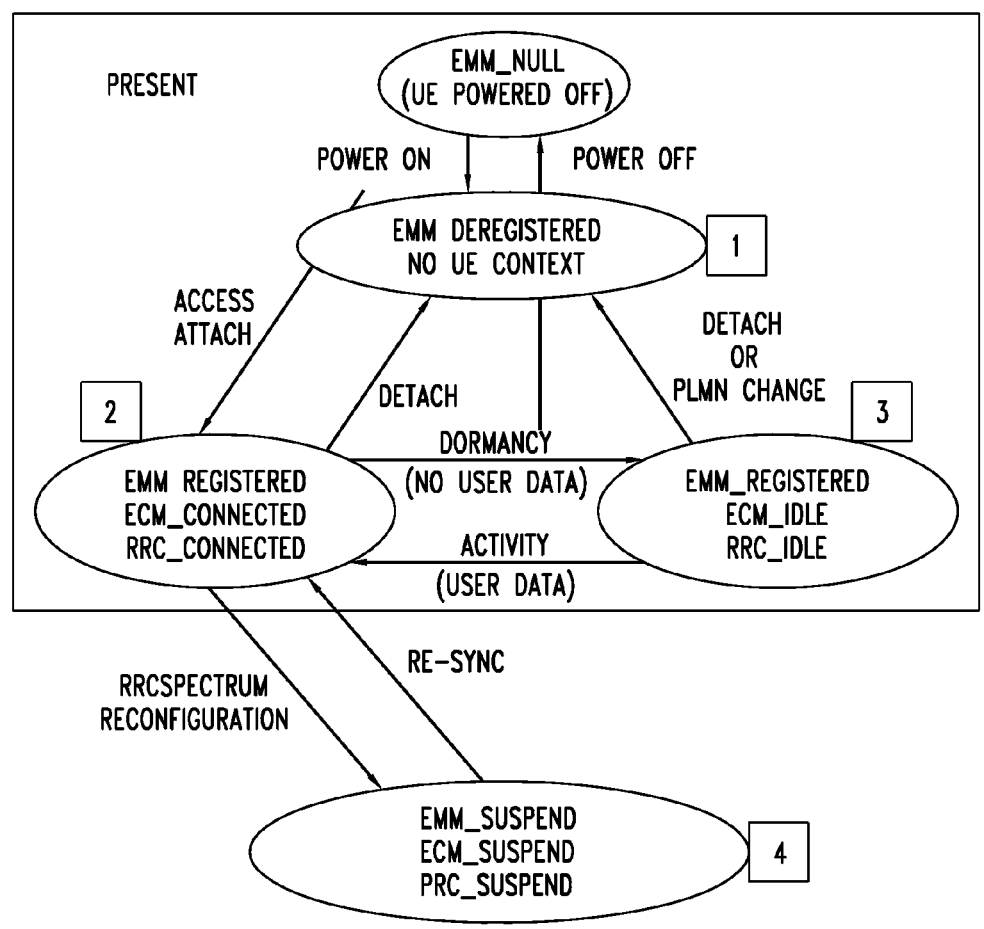
FIG. 6 is a symbolic representation of LTE network operations in the form of a state machine. The figure includes enhancements that are intended to support radio spectrum reconfiguration.

Turning to FIG. 6, it will be seen that LTE operations under the current standards may be represented as a state machine having a plurality of states and transitions between states. As seen in the figure, the states supported under current standards include several Radio Resource Control (RRC) states, several EPS Connection Management (ECM) states, and several EPS Mobility Management (EMM) states. These states are managed collectively by the UE, E-UTRAN (including eNodeB) and EPC (including MME) entities. Each state listed in the figure is a state of a respective one of several network entities, relative to one given UE. As represented in the figure, the states of the individual network entities are grouped into collective states numbered 1-3, each of which corresponds to one of the possible states of the given UE, and a newly introduced collective state denoted by the numeral 4, which will be described below.

More specifically, collective state 1 is the Power Down state. It is a transitory state, entered when the UE is turned on, during which the EPC is (briefly) unaware of the UE. Collective state 2 is the Active state, during which the UE is connected to the network and is participating in uplink and downlink data transfers. Collective state 3 is the Dormant state, in which the network is aware of the UE, but there is no transfer of data between the UE and the eNodeB.

The RRC states, which are respectively identified in the figure as RRC_IDLE and RRC_CONNECTED, represent downlink and uplink connectivity between the eNodeB and the UEs. In RRC_IDLE, the UE has no active radio channel to the eNodeB. In RRC_CONNECTED, by contrast, the UE and eNodeB are connected.

The ECM states, which are respectively identified in the figure as ECM_IDLE and ECM_CONNECTED, represent the signaling connectivity between the UEs and the EPC. In ECM_IDLE, there is no connectivity between the UE and the EPC. In ECM_CONNECTED, by contrast, there is active signaling connectivity between the UE and the EPC.

The EMM states, which are respectively identified in the figure as EMM_DEREGISTERED and EMM_REGISTERED, represent the mobility status of the UEs resulting from a mobility management procedure, such as Tracking Area Update (TAU) as described in the 3GPP standards document 3GPP TS 36.300, "Evolved Universal Terrestrial Radio Access (EUTRA) and Evolved Universal Terrestrial Radio Access Network (EUTRAN)—Overall description," http://www.3gpp. org/ftp/Specs/htmlinfo/36300.htm. In EMM_

DEREGISTERED, the MME does not know the location of the UE, whereas in EMM_REGISTERED, the MME knows the location of UE with sufficient confidence for pages to be sent to the UE.

We will now describe exemplary enhancements which are intended to support dynamic spectrum reconfiguration. We add a set of new states that we collectively designate SUSPEND states. The collective SUSPEND state is identified by reference numeral 4 in the figure. As seen there, the SUSPEND states are EMM_SUSPEND, ECM_SUSPEND, and RRC_SUSPEND. The process of suspending the UE is similar to the discontinuous reception (DRX) process which is described in the standards document 3GPP TS 36.331, "3rd Generation Partnership Project; Technical Specification Group Radio Access Network; Evolved Universal Terrestrial Radio Access (E-UTRA); Radio Resource Control (RRC); Protocol specification", and also in the standards document 3GPP TS 36.331, "3rd Generation Partnership Project; Technical Specification Group Radio Access Network; Evolved Universal Terrestrial Radio Access (E-UTRA); Medium Access Control (MAC) protocol specification," 3gppprotocol.com/web documents/36321-930-eutra-mac-proto.doc. However, our new SUSPEND process requires the UE to be given sufficient information so that, upon waking up, it can migrate to the newly reconfigured (i.e. retained) spectrum on the same serving cell.

The process of spectrum reconfiguration begins after the MME receives a spectrum release request from the SE. The MME forwards the request to the supply sector. The supply sector, in cooperation with the MME, then initiates spectrum reconfiguration by transitioning the RRC into the RRC_SUSPEND state and sending a newly defined message, which we designate the RRCSpectumReconfiguration message, to all active UEs. The supply sector also requests the MME, together with the P-GW and S-GW, to suspend all exchange of mobility data and all signaling procedures relative to those UEs, and to transition into EMM_SUSPEND and ECM_SUSPEND.

Here, the RRCSpectumReconfiguration message is an extension of the RRCConnectionReconfiguration message, also referred to as the "Handover Command" message sent to the UE by a source cell to hand the UE over to a target cell. In addition to the contents of RRCSpectrumReconfiguration message, the RRCSpectumReconfiguration message contains the center frequency and bandwidth (for example 5 MHz in the illustration provided above) of the reconfigured spectrum, and the time duration over which the mobility and signaling procedures are to be suspended. It is desirable for the suspension duration to approximate, as closely as possible, the data (i.e., user-plane) interruption duration experienced by the UE in intra-frequency LTE hard handover. Typical data interruption durations are tens of milliseconds.

The UEs treat the new RRC spectrum reconfiguration message as an order to temporarily suspend their connections to the eNodeB and to the EPC, and to transition into the SUSPEND states, i.e., into RRC_SUSPEND, EMM_SUSPEND and ECM_SUSPEND. In these SUSPEND states, the active UEs are in a temporary radio blackout, in which they do not receive pages, do not send any user-plane (U-plane) or control-plane (C-plane) messages to the E-UTRAN or to the EPC, and likewise do not receive any U-plane or C-plane messages from the E-UTRAN or the EPC.

During the blackout period, the cell reconfigures its RF front end, which may include, for example, changing the settings of radios, amplifiers, filters, and the like. The cell also updates the MIB and SIB messages, using known procedures, to reflect changes in the common radio resource configuration, specifically changes in the center frequencies and bandwidths of the reconfigured spectrum and in the locations of the Random Access Channel (RACH) on the reconfigured spectrum.

A UE will exit from its SUSPEND state when a specified suspension duration has expired. Care should be taken, however, that the eNodeB has reconfigured the spectrum before the UEs exit the SUSPEND state. After the suspension duration has expired, the UEs begin to decode the Physical Broadcast Channel (PBCH) and the Primary and Secondary Synchronization Channels (respectively P-SCH and S-SCH) and they begin to resynchronize to the reconfigured channel.

For resynchronizing and reconfiguring the UEs, the eNodeB can send out spectrum reconfiguration instructions in the form of a broadcast message (currently not defined in 3GPP) which is read and acted upon by all of the UEs. Such a broadcast message is not currently defined in 3GPP, but appropriate formats and content for such a message will be readily apparent to those skilled in the art. Such an approach is economical in its use of signaling overhead, but it may lead to contention among multiple UEs that are responding within the same time interval.

In a different approach presented here, the eNodeB individually directs the synchronization and reconfiguration of the UEs via point-to-point RRCSpectumReconfiguration messages that use a staggered approach to avoid collisions between UEs. That is, the suspension durations may be incrementally varied among the UEs, to assure that they will respond at different times. The random-access response (RAR) backoff times may also be used. A further measure for the avoidance of collisions is to use contention-free preamble IDs, which are well-known in the context of LTE contention-free handover procedure.

Once it has been synchronized, a UE will next send out an RRCSpectumReconfigurationComplete message, to confirm the reconfiguration to the eNodeB. This message is similar to the "Handover Complete" message that a UE sends to confirm a successful handover in LTE networks. With transmission of RRCSpectrumReconfigurationComplete, the UE transitions into the CONNECTED states. Also, as indicated by reference numeral of the figure, the eNodeB upon reception of the RRCSpectrumReconfigurationComplete message transitions its UE state (i.e., the state that it maintains for the given UE) to the RRC_CONNECTED state, and it informs the EPC and the MME to transition their states of the UE to ECM_CONNECTED and EMM_REGISTERED.

Those skilled in the art will appreciate that the overall spectrum reconfiguration process can be viewed as a special case of inter-frequency handover, but instead of handing over from a source cell to a different target cell, the UE hands over to the same cell (i.e. the source and target cells are the same) but on a newly reconfigured part of the carrier spectrum.

Because the UEs remain within the same tracking area during the spectrum reconfiguration, they are not required to re-register with the MME. Consequently, they are transitioned into EMM_REGISTERED directly from the EMM_SUSPEND state.

At the end of the radio spectrum reconfiguration process, the MME indicates the release of the underutilized portion (for example, 15 MHz out of 20 MHz in the above illustration) of the source spectrum to the SE. Then, the SE notifies the borrowing network of the (e.g., 15 MHz) spectrum release, and the borrowing network initiates spectrum acquisition process relative to the released spectrum. In the acquisition process, the borrowing MME initiates configuration of the selected cells to operate on the borrowed spectrum.

The Spectrum Division and Sharing process has an entirely analogous inverse process, which we refer to as "Spectrum Resolution and Integration". The Spectrum Resolution and Integration process is performed by the supply sector after the sharing agreement is dissolved.

Description and Illustrative Embodiments of the Present Invention

Virtualized Resource Sharing I

The Multi-Operator Virtual eNB (MoV-eNB)

We now introduce a new Multi-Operator Virtual eNB (MoV-eNB) which offers advantages over other sharing technologies, as will be seen below. In particular, the MoV-eNB offers a multiple personality, in the sense that a single physical entity can be virtually owned by multiple network operators.

By "radio resources", we mean resources for over-the-air transmission that may be subject to allocation by a scheduler. In the discussion below, the radio resources discussed particularly are frequency spectrum and, especially in the LTE context, Physical Resource Blocks (PRBs). A PRB has dimensions of both frequency and time. It should be borne in mind that these types of radio resources are merely exemplary and not intended to be limiting. For example, other radio resources that may be useful in the present context include code (e.g., in the CDMA context), and space (in the context of spatial multiplexing).

Figure 7:
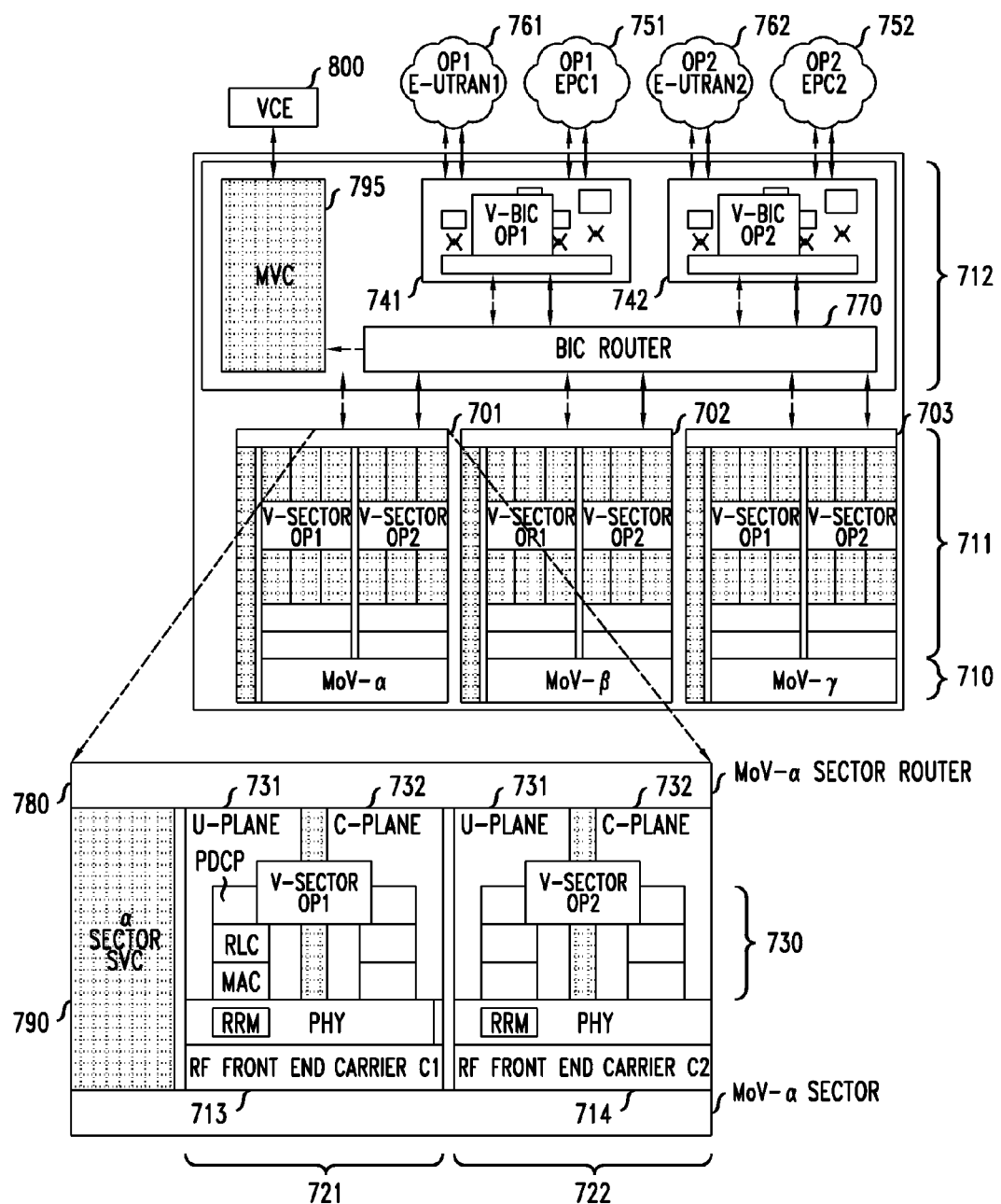
FIG. 7 is a functional block diagram that notionally represents an illustrative Multi-operator Virtual eNodeB (MoVeNB) according to a herein-described embodiment.

FIG. 7 is a functional block diagram that notionally represents an illustrative MoVeNB which has three sectors 701-703 (respectively denoted α, β and γ) and serves two operators. The example of a dual-operator eNB is not limiting, as extensions to three or more operators are straightforward.

As seen in the figure, the MoVeNB has three main classes of hardware components: RF front end 710, channel card 711, and backhaul interface and control card (BICC) 712. Each sector has a dedicated RF front end and a dedicated channel card. Conversely, all three sectors share a common BICC.

The channel cards and the BICC are virtualized, as will be explained in greater detail below. The RF front ends are based on the software-defined radio (SDR) platform and as a consequence, they are dynamically tuneable to specifiable frequencies and bandwidths. In particular, multiple channel bandwidths can be supported.

Each sector, in the example of FIG. 7, embodies two independent virtual (or equivalently, "logical") sectors representing respective LTE cellular network operators op1 and op2. Thus, for example, the FIG. 7 inset symbolically shows the virtualization of the α-sector for the benefit of operators op1 and op2. Each virtualized sector 721, 722 is referred to as a V-sector, and its controlling operator is referred to as a Virtual Operator (V-operator). Accordingly, there are a total of six V-sectors operating under the α, β and γ sectors of the MoV-eNB illustrated in the figure. It will be seen most clearly in the inset of FIG. 7 that each V-sector has a respective software-defined programmable radiofrequency front end (SDRFfe) 713, 714. The SDRFfes may each be implemented as a physical entity, i.e. in hardware components. Alternatively, the SDRFfes may be implemented as logical entities that coexist on common processor hardware.

In specific regard to the channel card serving a particular sector, it should be noted that the virtualization is typically achieved by configuring the hardware processor so that it can support multiple instantiations of the protocol stack 730, i.e., one instantiation for each network operator.

Within a given physical sector, each V-sector can operate on a different spectrum band. Thus, for example, the respective RF front ends of the two V-sectors defined in the α-sector of FIG. 7 are operating on distinct spectrum bands B1 and B2 which are respectively licensed to op1 and op2. Through logical instantiation, as noted above, each V-sector has its own independent U-plane 731 and C-plane 732 protocol stacks supporting the PHY, PRM, MAC, RLC and PDCP layers of the LTE-Uu interface. One advantage that flows from such logical instantiation is that the U-plane and C-plane protocol stacks can be customized and optimized to suit each V-operator's network.

Like the channel card, the BICC 712 is also virtualized to support, e.g., two operators' backhaul interfaces and control functionalities, as seen in FIG. 7. Each virtual backhaul interface and control (V-BIC) module 741, 742 connects to its own EPC 751, 752 and E-UTRAN 761, 762 using S1 and X2 interfaces, respectively. Each V-sector connects to its V-BIC via a router module 770 as shown in the figure. In implementations, the V-BIC modules are logical entities, i.e., different tasks running on the same processing hardware.

The U-plane and C-plane packets embodying messages from the V-sector are sent to a sector router 780 (which will be understood to be a type of common aggregation layer) in the channel card. The sector router directs the packets to the BICC, from which they are routed to their respective V-BIC modules. Likewise, the packets received from the EPC and the E-UTRAN are routed to their respective V-sectors to be sent out to UEs over the LTE-Uu wireless interface.

In our representation of the MoV-eNB in FIG. 7, we assume a symmetric sector virtualization in which each physical sector has an equal number (i.e. two, in this example) of V-sectors, each representing a respective operator. However, it should be understood that the MoV-eNB can alternatively be configured to have different numbers of V-sectors in different physical sectors.

As seen in FIG. 7, a Sector Virtualization Controller (SVC) module 790 is provided in each physical sector. This module configures and enables the operator-specific V-sectors within its physical sector. The SVC modules are controlled by the Main Virtualization Controller (MVC) module 795, which resides in the BICC. The SVC and the MVC communicate to each other via the sector router in the channel card and the router module in the BICC.

The MVC also configures and enables the operator-specific V-BIC modules. The MVC connects to a Virtualization Control Entity (VCE) 800. The VCE is operated by the owner of the MoV-eNB. It configures the V-BIC, the V-sectors, and other functionalities and modules on the MoV-eNB platform.

Figure 8:
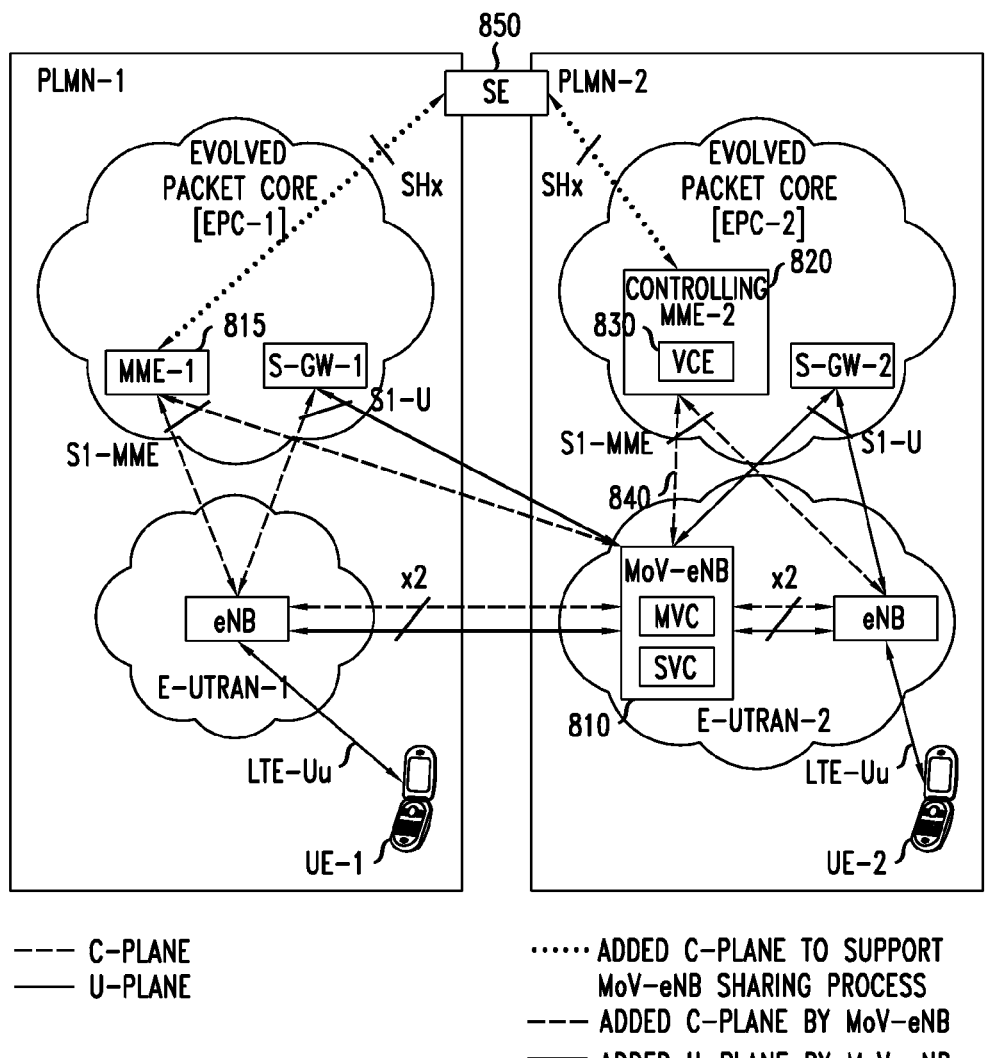
FIG. 8 is a functional block diagram that notionally represents an architecture, here referred to as Sharing Scenario 1, which uses an MoV-eNB for sharing between two LTE networks PLMN-1 and PLMN-2 operated by respective operators op1 and op2.

FIG. 8 is a functional block diagram that notionally represents an architecture, here referred to as Sharing Scenario 1, which uses an MoV-eNB 810 for sharing between two LTE networks PLMN-1 and PLMN-2 operated by respective operators op1 and op2. We assume the MoV-eNB is owned by op2, and thus by assumption, the MME 820 of PLMN-2 (i.e., MME-2) is the controlling MME and the VCE module 830 is implemented within it. Accordingly, the VCE communicates with the MoV-eNB over the S1-MME interface 840.

Figure 9:
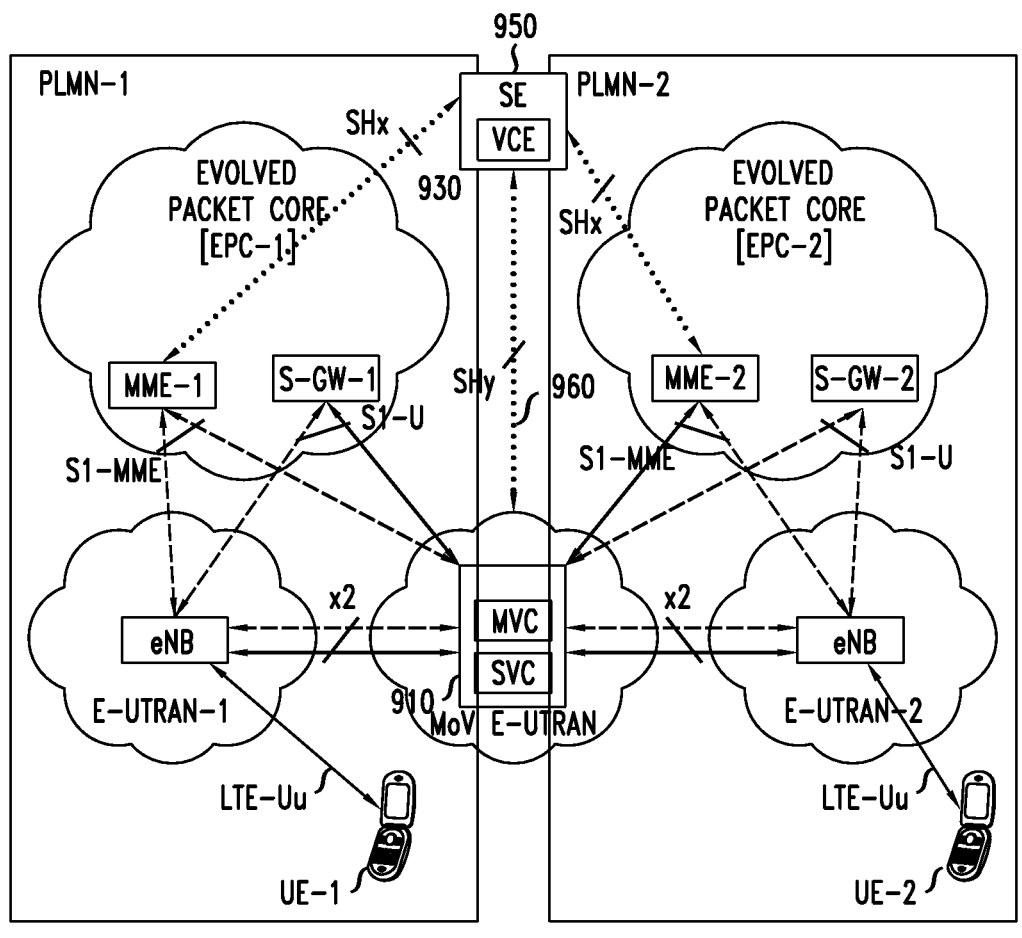
FIG. 9 is a functional block diagram that notionally represents an alternative architecture, here referred to as Sharing Scenario 2, in which no LTE operator owns the MoV-eNB but rather, a private company or other third party owns the MoV-eNB and leases it to the operators op1 and op2.

FIG. 9 is a functional block diagram that notionally represents an alternative architecture, here referred to as Sharing Scenario 2, in which no LTE operator owns the MoV-eNB 910. Instead, a private company or other third party owns the MoV-eNB and leases it to the operators op1 and op2. In this instance, the third party also controls the VCE 930, which now is co-located with the SE 950. The VCE communicates with the MoV-eNB over a new IP-based interface 960 that we have named the SHy interface. The VCE and the SE communicate with each other over the SHy interface during the sharing process.

The following discussion assumes Sharing Scenario 1, as illustrated in FIG. 8.

The sharing process as described above controls, coordinates, and manages the MoV-eNB sharing. The SE connects to the MMEs over SHx interfaces and coordinates the MoV-eNB sharing process between PLMN-1 and PLMN-2. Through the sharing process, both PLMNs can dynamically create and change their hardware sharing agreements by activating and deactivating V-sectors on the MoV-eNB.

The MME 815 of PLMN-1 (MME-1) provides configuration information for the requested virtualization to the VCE 830 (co-resident with MME-2) via the SE 850. The VCE forwards the configuration information to the MVC and SVC modules of the MoV-eNB, which act upon it to activate the V-BIC and V-sectors of PLMN-1.

Configuration information for the V-BIC includes, among other things, the IP addresses of MME-2 and S-GW-2, Operation Administration and Management (OAM) parameters, and admission-control parameters.

Configuration information for the V-sector includes the spectrum information (i.e., channel center frequencies and bandwidths) for the RF front end and various configuration parameters for the PHY, PRM, MAC, RLC and PDCP layers. Activation of the V-sectors and the V-BIC module of PLMN-1 enables the MoV-eNB sharing between the PLMN-1 and the PLMN-2.

When requested to do so, the VCE 830 (co-resident, as noted, with MME-2) also deactivates the V-sector and the V-BIC module to disable the MoV-eNB sharing.

Virtualized Resource Sharing II

V-Sector Spectrum Sharing (VSS)

We will now describe a scheme, which we have named V-sector Spectrum Sharing (VSS), for using the MoV-eNB to share spectrum among active V-sectors. Since each V-sector (within a given physical sector) represents a different operator, the VSS is a type of interoperator spectrum-sharing scheme.

In the approach to spectrum sharing that we described above and that was the subject of our U.S. patent application Ser. No. 13/461,979, the SE was used to coordinate, negotiate, and manage spectrum sharing among the participating LTE operators. However, the SE is a higher-level entity in the network hierarchy and as a consequence, spectrum release and transfer between operators via the SE is relatively time consuming. The VSS scheme that we will now describe is advantageous not least because the corresponding process runs locally, i.e. within the hardware of a particular sector and coordinated among the various V-sectors, and hence can be much faster.

Figure 10:
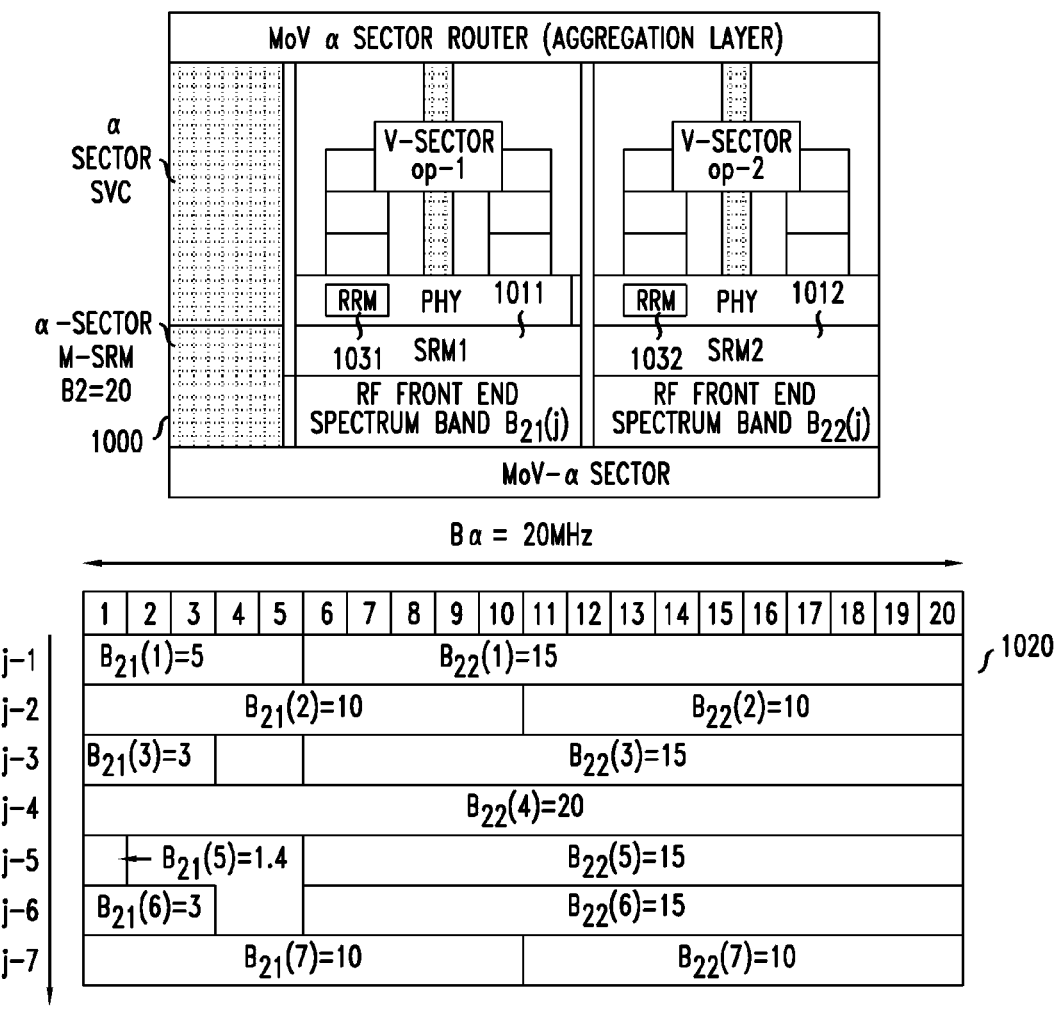
FIG. 10 is a functional block diagram that notionally illustrates an α-sector of an MoV-eNB that has been configured to share a band B2 of cellular spectrum of bandwidth 20 MHz between the V-sectors of two operators op1 and op2.

FIG. 10 is a functional block diagram that notionally illustrates an α-sector of an MoV-eNB that has been configured to share a band B2 of cellular spectrum of bandwidth 20 MHz between the V-sectors of two operators op1 and op2. We assume that B2 is a continuous band of cellular spectrum owned by op2 (i.e. the operator of PLMN-2), which also controls the MoV-eNB.

As seen in the figure, the physical sector includes a module 1000 denominated the Main Spectrum Resource Management (M-SRM) module, and each V-sector includes a respective module 1011, 1012 denominated the Spectrum Resource Management (SRM) module. The M-SRM and SRMs participate in the localized spectrum sharing process. The M-SRM, in particular, allocates B2 between the respective SRMs.

The SRMs for the V-sectors of op1 and op2 are designated as SRM-1 and SRM-2 respectively. Each SRM periodically estimates its spectrum demand based on its current bandwidth utilization and other KPIs and communicates the estimated spectrum demands to the M-SRM. The M-SRM collects the spectrum demands from all SRMs and allocates portions of B2 to the respective SRMs based on desired criteria such as profit maximizing pricing, utility functions, and such others as might be chosen by the network operators.

As an aid to understanding the allocation of spectrum B2, we have provided in FIG. 10 a schematic diagram 1020 in which the span of B2 in the radio frequency dimension is represented along the horizontal axis. We have stacked in vertical sequence seven strips numbered j=1 to 7, which represent different instances of spectrum allocation between the V-sectors as the allocation varies over discrete time.

In each timeslot j, the subbands of spectrum assigned to op1 and op2 are designated as $B_{21}(j)$ and $B_{22}(j)$ respectively. In an LTE frequency-division duplex (FDD) system, it is assumed that equal bandwidths are allocated to the uplink and the downlink. In LTE, the smallest quantum of bandwidth that can be assigned to an to individual operator is 1.4 MHz. Of course, it is possible that no bandwidth is assigned to a given operator in a given instance j. Accordingly, the bandwidth assignment to an individual V-sector $B_{2i}(j)$ of an LTE network will be 0, 1.4, 3, 5, 10, 15, or 20 MHz.

A further constraint is that the total sum of bandwidth, e.g. $B_{21}(j)+B_{22}(j)$, assigned to all operators must be less or equal to the total bandwidth B2=20 MHz. The unused bandwidth at a given instance j would be equal to $B2-B_{21}(j)-B_{22}(j)$.

Any change in the bandwidth allocation to a V-sector is communicated to the radio resource management entity (RRM) 1031, 1032 of that sector by the corresponding SRM. In each new spectrum allocation instance j, the RRM places its PHY scheduling under a constraint on bandwidth resources. For example, if op2 is assigned 5 MHz of bandwidth at an instance j (i.e., $B_{22}(j)$=5 MHz), the SRM of op2 (SRM-2) will have only 25 physical resource blocks (PRBs) available. (In LTE, the PRB is the frequency-time block that is the minimum unit of scheduling on both the uplink and the downlink. It spans 1 ms of time and 180 kHz of bandwidth. Thus, rounded down to the nearest integer, 5 MHz corresponds to 25 PRBs.) In the next instance j+1, if the bandwidth assigned to op2 is increased to 10 MHz, i.e. $B_{22}(j+1)$=10 MHz, the physical resources available to SRM-2 will increase from 25 to 50 PRBs.

It should be understood that VSS occurs in the analog domain, so that each time there is a change in the spectrum allocation to a V-sector, the RF front end of that V-sector must be reconfigured to operate on the newly assigned frequency and bandwidth. In implementations, the reconfiguration is performed according to the process for spectrum division and sharing described by FIG. 6 and the accompanying discussion, above. Such reconfiguration may be disadvantageous in some circumstances, because reconfiguring the RF front end can consume a significant period of time during which wireless service to the UEs is suspended, as explained above in our discussion of (non-virtualized) spectrum sharing.

As also explained in our preceding discussion of spectrum sharing, it is necessary to inform the UEs belonging to each operator of changes in the spectrum configuration. According to one option, a pre-designated channel is used for that purpose. However, the location and configuration of such a channel would have to be static. The pre-designated channel could be implemented as a subband within B2, or, alternatively, it could be implemented as an out-of-band channel that is external to B2.

It should be noted in this regard that current standards for LTE-Advanced to (LTE-A) support discontinuous spectrum aggregation as part of the spectrum flexibility feature. To enable faster reconfiguration, the feature of discontinuous spectrum aggregation can be exploited. That is, one band from a multiplicity of discontinuous spectrum bands can be specially designated for the spectrum reconfiguration communication between UEs and V-sectors, while the other bands of the discontinuous spectrum are made available for reconfigurations and sharing among the V-sectors.

Figure 11:
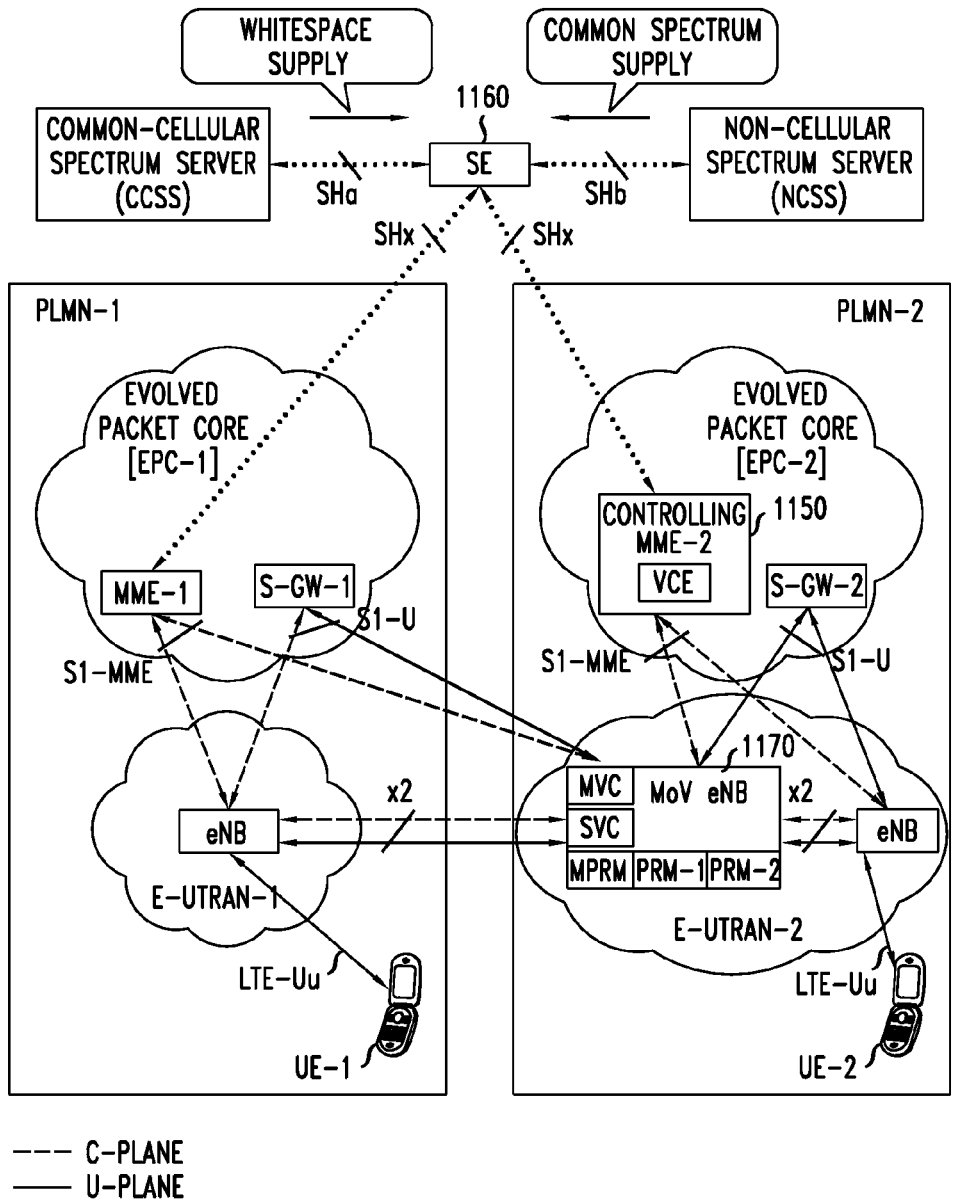
FIG. 11 schematically describes an illustrative architecture for enabling the sharing of whitespace or common spectrum among V-sectors.

Until now in this discussion, it has been assumed that B2 is cellular spectrum owned by LTE operator op2. It should be understood that such an assumption is merely illustrative, and that various other ownership scenarios for the shared spectrum are possible. For example, B2 may be whitespace borrowed from third parties such as DTV operators and government spectrum-broker entities. FIG. 11, e.g., shows an illustrative architecture for enabling the sharing of whitespace among V-sectors. As seen in the figure, the controlling MME-2 (reference numeral 1150 of the figure) borrows whitespace from the SE 1160 and makes it available for use by the MoV-eNB 1170. Accordingly, the MoV-eNB is shared by two operators, and the borrowed whitespace is also shared by the two operators using the VSS scheme as we have described it above.

Virtualized Resource Sharing III

V-Sector PRB Sharing (VPS)

Figure 12:
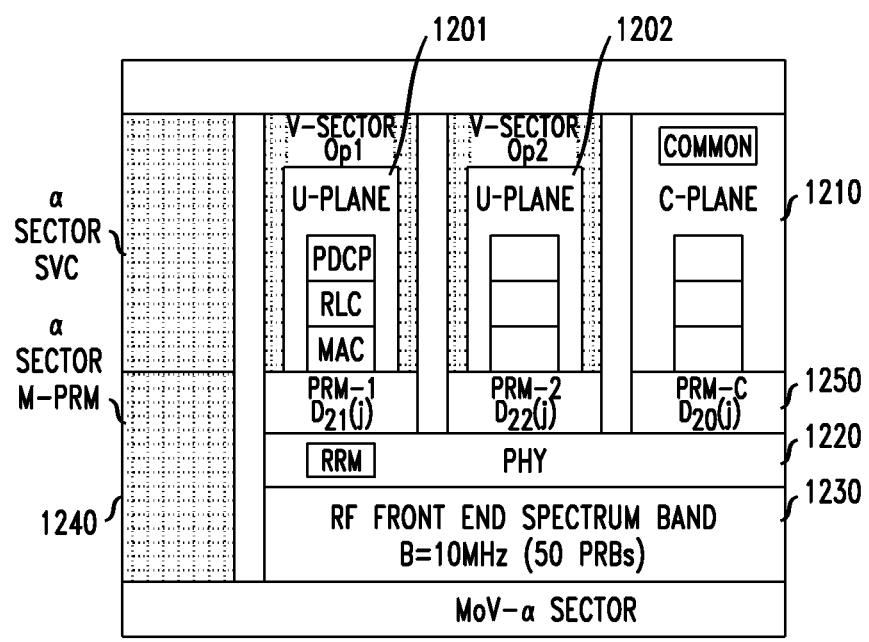
FIG. 12 is a functional block diagram that notionally shows an illustrative MoV sector that has been enhanced for V-sector PRB Sharing (VPS) according to a herein-described embodiment.

Above, we have described a scheme for the sharing of spectrum among V-sectors. With reference to FIG. 12, we will now describe a scheme for sharing of PRBs among V-sectors, which we have named V-sector PRB Sharing (VPS).

FIG. 12 is a functional block diagram that notionally shows an illustrative MoV α-sector that has been enhanced for VPS. As seen in the figure, there are two separate U-plane protocol stacks 1201, 1202 for the respective operators op1 and op2, a common C-plane stack 1210, a common PHY layer 1220, and a common RF front end 1230. The RF front end operates on a 10-MHz cellular spectrum band B2 owned, in this example, by op2 which, as above, is the operator of PLMN-2. As discussed earlier, B2 can in some scenarios be borrowed whitespace.

The protocol stack implemented in the common C-plane operates to aggregate the broadcast and control messages from both operators. (Extensions to more than two operators are straightforward.) The Common C-plane prepares the aggregated messages for transmission, as appropriate, on the broadcast, access, and common control channels.

The MoV sector of FIG. 12 also includes Main Physical Resource Management (M-PRM) 1240 and individual Physical Resource Management (PRM) modules 1250-1252 to support the VPS. The MPRM is part of the SVC within the physical sector, e.g. the α-sector of the figure. As shown in the figure, each operator has its own PRM, respectively denominated PRM-1 or PRM-2, which is implemented as part of the operator-specific U-plane protocol stack. There is also a PRM, denominated PRM-C, which is implemented as part of the common C-plane protocol stack.

For purposes of illustration, we have assumed in FIG. 12 that the number D2 of PRBs (in both the downlink and the uplink) that are available in the 10-MHz FDD spectrum band B2 is 50. The fifty PRBs are divided into two disjoint groups that we have respectively named Common Reserved Resource Blocks (CRRBs) and Dynamically Shared Resource Blocks (DSRBs).

The M-PRM dynamically shares the DSRBs between the two operators. The DSRBs carry U-plane information to and from the UEs of the two operators. The CRRBs are given higher priority, and a fixed amount of CRRBs is permanently reserved by the M-PRM for carrying the common C-plane messages, which include, e.g., messages on the broadcast, access, and common-control channels.

The CRRBs are further subdivided into broadcast, access, and common-control channel resource blocks. The broadcast CRRBs are used to deliver MIB and SIB messages to the UEs. The SIB1 and SIB2 messages contain the LTE network access information including the PLMN ids of op1 and op2 (i.e., the ids of PLMN-1 and PLMN-2 respectively).

After collecting the MIB and SIB messages, a UE uses the access and common-control CRRBs to gain access to its desired LTE network (i.e., to either PLMN-1 or PLMN-2). The use of CRRBs and the use of a common (for all operators) C-plane protocol stack are joint features of an approach which, among other things, is more economical in the use of PRBs than approaches in which each operator has its own broadcast, access, and common-control channels.

As discussed earlier, a UE in our example selects its affiliation to an operator to based on the PLMN id seen in the SIB1 message. The UE announces its affiliation in terms of PLMN id to the eNB in an LTE random access procedure. Based on the affiliation information received during the access process, the M-PRM constructs a routing table to route any U-plane message from the UE to its affiliated operator's U-plane stack.

The M-PRM also periodically collects information concerning the common physical layer, and in particular information specific to the radio channel, as listed below, relative to all active UEs of all operators:

(a) Estimates of the uplink narrowband and wideband SINR based on known reference or pilot signals transmitted by the UEs for uplink scheduling and uplink closed-loop power control inter alia. Exemplary signals that may be useful for this purpose are the Demodulating Reference Signal and the Sounding Reference Signal as defined in the LTE standards.

(b) Estimates of the uplink pathloss of the UE for uplink power control inter alia;

(c) Estimates of downlink SINR based on CQI reports from the UEs for downlink scheduling inter alia;

(d) Estimates of interference over thermal (IoT) to manage inter-cell interference.

Advantageously, the M-PRM uses at least some of the information listed above to intelligently select DSRBs to best serve the UEs and to maximize performance.

We will now describe a two-tier scheduler which is advantageous for supporting PRB sharing among the operators. In the first tier, the individual PRM is responsible for pre-selecting its UEs for scheduling according to priorities that are defined for the pertinent V-sector and operator, and for sending the list of pre-UEs to the M-PRM. In the second tier, the M-PRM combines the pre-selected UE lists from all PRMs, puts them into a single priority list, selects one or more UEs from the priority list to create a selected UE list, and feeds back the selected UE list to the PRMs. Then, the PRMs send U-plane packets for the selected UEs to the common PHY layer to be sent over-the-air on the DSRBs.

The PRM-C sends broadcast, page, and common-control channel messages to the M-PRM for over-the-air transmission on the CRRBs. The C-plane messages will typically be treated as having higher priority than the U-plane messages.

In the two-tier scheduler, it is advantageous if the M-PRM is free to make asymmetric allocations of DSRBs to the respective PRMs. A typical choice of scheduling discipline for allocating available DSRBs among, e.g., the two operators op1 and op2 is the proportional fair (PF) algorithm.

It is especially advantageous that, in the event of an instantaneous spike in bandwidth demand, the PF algorithm will allocate the biggest spectrum chunks to the highest demanding operator, and thus will help to alleviate sudden, sporadic, or periodic surges in customer traffic.

In an alternative scheduling approach, each PRM periodically estimates its DSRB demand based on its current DSRB utilization and other KPIs, and communicates its DSRB request to the MPRM. The M-PRM collects the DSRB demands from PRM-1 and PRM-2, and then it assigns an appropriate amount of DSRBs to each PRM. The assignment can be based on one or more criteria such as profit-maximizing pricing, utility functions, and the like.

The M-PRM manages the CRRBs and the DSRBs of both the uplink and the downlink. It uses downlink and uplink PRB maps to keep track of which PRBs are allocated (or in use), which are reserved, and which are free.

FIG. 13 provides an example of a map of fifty downlink PRBs, referred to here as a PDMAP, which in this example is associated with a 10-MHz downlink shared spectrum band. In the figure, i and j represent the PRB index and the TTI index, respectively. A TTI is a transmission time interval, which in this example occupies a 1-ms subframe. A 50-PRB uplink map (PUMAP) associated with a 10-MHz uplink shared spectrum band managed by the M-PRM can be defined in analogous fashion to the PDMAP.

The PDMAP is a continuous time-frequency physical resource (i.e. PRB) map which looks ahead by a 20-ms time period. The DSRBs allocated, per TTI, to PRM-1 and PRM-2 are identified in the figure as $D_{21}(j)$ and $D_{22}(j)$, and the free DSRBs are identified as $D_{2F}(j)$. The CRRBs reserved for the common C-plane messages including broadcast, access, common-control and dedicated-control channels are identified as $C_{2C}(j)$.

The values of $C_{2C}(j)$ depend on the particular implementation of the eNB and can vary from operator to operator.

For bookkeeping purposes, the M-PMR advantageously also calculates the individual uplink and downlink DSRB utilization per operator.

Up to now in this discussion, the spectrum shared among V-sectors by VPS has been assumed to be a continuous spectrum band B2. In other scenarios, however, discontinuous spectrum might be shared. By way of example, we now assume that there are two discontinuous licensed LTE FDD spectrum bands B1 and B2 owned by op1 and op2 respectively and available to share among the V-sectors.

According to one option, the two bands are designated as separate LTE carriers, having separate broadcast, access, and common-control channels. Each carrier broadcasts the PLMN ids of both operators (i.e. PLMN-1 and PLMN-2) in its SIB1 messages, so that UEs of both operators can access both bands.

According to a second option, overhead is reduced by designating only one of the LTE carriers for access. The UEs from all the operators use the one designated carrier for access. Later, the M-PRM performs carrier load balancing (also referred to as carrier redirection or transfer) by evenly distributing the UEs between the two carriers.

Once a UE has been assigned to a carrier, it will remain on that carrier for the entire duration of its data session. However, it could happen that a UE goes into dormancy mode on one carrier, and while dormant on the first carrier, it comes back and becomes active on a second carrier. It should be noted in this regard that if the carrier dimension is added to the UE context, which is part of the cell-management data structure, the M-PRM can link each UE to its session carrier along with its operator affiliation.

As noted above, a UE announces its operator affiliation in terms of PLMN id to the eNB in an LTE random access procedure. Based on the affiliation information received during a UE's access process and on the UE's assigned session carrier, the M-PRM constructs a routing table to route U-plane information from the UE to its affiliated operator's U-plane protocol stack. The M-PRM also manages the uplink and downlink CRRBs and the DSRBs on both carriers. The M-PRM keeps track of which PRBs are allocated (or in use), which are reserved, and which are free using downlink and uplink PRB maps of both carriers.

In yet a third option for sharing of discontinuous spectrum, the discontinuous spectrum aggregation feature available in LTE-A networks is utilized so that the respective bands (e.g., B1 and B2 of our above example) need not be treated as separate LTE carriers.

Comparison between V-Sector PRB Sharing (VPS) and V-Sector Spectrum Sharing (VSS)

Below, we note certain distinctions between the VPS approach and the VSS approach described in the preceding discussion.

VPS is implemented in the digital domain via baseband processing on the channel card. Unlike VSS, which is implemented in the analog domain, VPS does not require the RF front end to be reconfigured for different spectrum at the beginning of each sharing instance. This is advantageous for avoiding service interruptions that could otherwise occur during such reconfiguration.

With VPS, LTE resources can be shared in quanta of spectrum as small as 180 KHz. By contrast, under existing standards, the smallest quantum of shared spectrum in VSS is 1.4 MHz. One advantage of the smaller quantum available with VPS is more freedom for the resource sharing scheduler to select beneficial frequency channels which can result in greater frequency selective gains. Another advantage is more efficient use of spectrum because the assignment of spectrum to a particular operator can be more closely matched to that operator's actual need.

LTE physical resource sharing can occur more quickly with VPS than with VSS. That is, the changes in DSRB distribution among operators can occur within a single, 1-ms TTI in VPS, whereas spectrum allocation and reconfiguration in VSS may require tens of milliseconds.

The common C-plane used in VPS conserves physical resources by carrying the broadcast, access, and common-control channels serving all operators.

I claim:

1. A method in a base station having one or more physical sectors, comprising:
  receiving instructions from a network node which identify two or more cellular network operators that are parties to a sharing agreement, and which specify an amount of radio resources that are to be temporarily shared under the sharing agreement;
  activating a sharing state in a selected one or more of the physical sectors in response to the sharing instructions; and
  deactivating the sharing state when the sharing agreement expires or terminates, wherein activating the sharing state in each said physical sector comprises:

configuring the physical sector to instantiate at least two concurrently running protocol stacks dedicated to respective cellular network operators that are parties to the sharing agreement, whereby respective virtualized sectors are defined;

configuring at least one software-defined programmable radiofrequency front end (SDRFfe) of the physical sector for operation on spectrum that is allocated in response to the sharing agreement; and directing mobile terminals subscribing to two or more of the network operators and served by the physical sector to operate on radio resources allocated to their respective operators.

2. The method of claim 1, wherein one of the parties to the sharing agreement is the cellular network operator that owns the base station.

3. The method of claim 1, wherein the specified amount of radio resources to be shared is a specified amount of spectrum.

4. The method of claim 1, wherein the specified amount of radio resources to be shared is a specified number of physical resource blocks.

5. The method of claim 1, wherein:
the sharing instructions received by the base station specify center wavelengths and bandwidths of two or more frequency bands that are to be dedicated to respective parties to the sharing agreement; and
the step of configuring at least one SDRFfe comprises configuring the SDRFfe to operate on at least one of the specified frequency bands.

6. The method of claim 1, wherein:
the physical sector comprises two or more physical or logical SDRFfes; and
the step of configuring at least one SDRFfe comprises configuring two or more physical or logical SDRFfes of the physical sector to operate on bands of spectrum allocated to respective operators in response to the sharing agreement.

7. The method of claim 1, wherein:
the radio resources are Physical Resource Blocks (PRBs), and the method further comprises, in at least one sector that has been activated for a sharing state among two or more operators:
scheduling data traffic of said operators for transmission on PRBs, wherein said scheduling is performed in accordance with the sharing agreement; and
transmitting the PRBs from a single radiofrequency front end.

8. The method of claim 7, wherein the step of configuring the physical sector to instantiate at least two concurrently running protocol stacks dedicated to respective cellular network operators comprises:
instantiating at least two concurrently running user-plane protocol stacks dedicated to respective cellular network operators; and
instantiating a control-plane protocol stack that is common to at least two of said operators and runs concurrently with said user-plane protocol stacks.

9. Base station apparatus, comprising:
at least one physical sector configurable to instantiate at least two concurrently running protocol stacks;
an activation module configured to activate a sharing state in at least one said physical sector in response to instructions to implement a sharing agreement received from a network node and to deactivate the sharing state when the sharing agreement expires or terminates, wherein the sharing state is characterized, in part, by concurrently running two or more protocol stacks dedicated to respective cellular network operators that are parties to the sharing agreement;
at least one software-defined programmable radiofrequency front end (SDRFfe) comprised by the physical sector;
a radio resource module configured to respond to the received instructions by configuring at least one said SDRFfe to operate on spectrum that is allocated in response to the sharing agreement; and
a module operative to direct mobile terminals subscribing to two or more of said network operators to operate on radio resources allocated to their respective operators.

10. The base station apparatus of claim 9, wherein the radio resource module is responsive to the received instructions by configuring the SDRFfe to operate on one or more bands of spectrum specified in said instructions.

11. The base station apparatus of claim 9, further comprising a scheduler configured to allocate physical resource blocks (PRBs) among two or more said operators.

12. The base station apparatus of claim 11, wherein:
at least one said physical sector that can be activated for a sharing state among two or more operators has only a single radiofrequency front end; and
said single radiofrequency front end is configurable to transmit the PRBs to the two or more operators among which they have been allocated.

13. The base station apparatus of claim 12, wherein the activation module is configured to respond to the received instructions by:
instantiating at least two concurrently running user-plane protocol stacks dedicated to respective cellular network operators; and
instantiating a control-plane protocol stack that is common to at least two of said operators and runs concurrently with said user-plane protocol stacks.

14. The base station apparatus of claim 9, wherein the physical sector comprises two or more physical or logical SDRFfes.

15. The base station apparatus of claim 14, wherein the radio resource module is able to configure two or more physical or logical SDRFfes of the physical sector to operate on bands of spectrum allocated to respective operators in response to the received instructions.

* * * * *